(12) United States Patent
Boll

(10) Patent No.: US 7,220,076 B2
(45) Date of Patent: May 22, 2007

(54) VEHICLE STOPPING METHOD AND APPARATUS

(75) Inventor: William Robert Boll, Welland (CA)

(73) Assignee: Boltek Corporation, St. Catharines (CA)

( * ) Notice: Subject to any disclaimer, the term of this patent is extended or adjusted under 35 U.S.C. 154(b) by 156 days.

(21) Appl. No.: 10/996,389

(22) Filed: Nov. 26, 2004

(65) Prior Publication Data
US 2005/0225163 A1 Oct. 13, 2005

(30) Foreign Application Priority Data
Nov. 28, 2003 (CA) .................................. 2451312

(51) Int. Cl.
*E01F 13/12* (2006.01)
*B60R 25/00* (2006.01)

(52) U.S. Cl. .......................................... 404/6; 180/287

(58) Field of Classification Search ................... 404/6, 404/9, 10; 180/287
See application file for complete search history.

(56) References Cited

U.S. PATENT DOCUMENTS

| | | | |
|---|---|---|---|
| 4,619,231 A | 10/1986 | Stolar et al. | |
| 4,660,528 A | 4/1987 | Buck | |
| 4,967,862 A | 11/1990 | Pong et al. | |
| 5,330,285 A | 7/1994 | Greves et al. | |
| 5,415,246 A | 5/1995 | Cooper | |
| 5,503,059 A | 4/1996 | Pacholok | |
| 5,536,109 A | 7/1996 | Lowndes | |
| 5,611,408 A * | 3/1997 | Abukhader | 180/287 |
| 5,645,137 A | 7/1997 | Pacholok | |
| 5,839,759 A | 11/1998 | Trigo | |
| 5,933,075 A | 8/1999 | Ditson | |
| 6,048,128 A | 4/2000 | Jones, III et al. | |
| 6,135,226 A | 10/2000 | Persichini et al. | |
| 6,220,781 B1 | 4/2001 | Miller | |
| 6,322,285 B1 | 11/2001 | Ben | |
| 6,409,420 B1 * | 6/2002 | Horton et al. | 404/6 |
| 6,551,013 B1 * | 4/2003 | Blair | 406/6 |
| 6,623,205 B1 * | 9/2003 | Ramirez | 404/6 |
| 2005/0214071 A1 * | 9/2005 | Collier | 404/6 |

FOREIGN PATENT DOCUMENTS

CA 2393380 12/2002

OTHER PUBLICATIONS

Travis, Jeremy, High-Speed Pursuit: New Technologies Around the Corner, National Law Enforcement and Corrections Technology Center, Oct. 1996. pp. 1-99.

* cited by examiner

*Primary Examiner*—Raymond Addie
(74) *Attorney, Agent, or Firm*—Bereskin & Parr

(57) ABSTRACT

A vehicle stopping apparatus for stopping a target vehicle has a capture loop large enough to loop over a vehicle tire, attachment means provided over a portion of the capture loop to attach the portion of the capture loop to the vehicle tire, and a tether coupled to the capture loop. The vehicle stopping apparatus may have an anchoring device coupled to the tether, the anchoring device adapted to apply a resistive force on the tether. Furthermore, the vehicle stopping apparatus may have a deployment mechanism adapted to transfer the capture loop from a set position wherein said capture loop is folded in a bundle, to a deployed position wherein said capture loop is extended across the path of said vehicle tire.

35 Claims, 21 Drawing Sheets

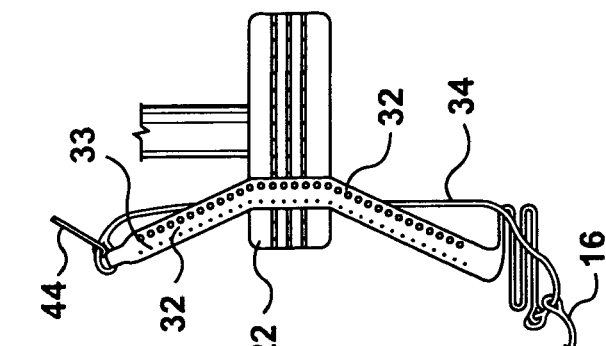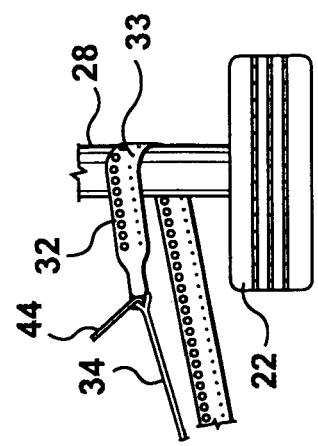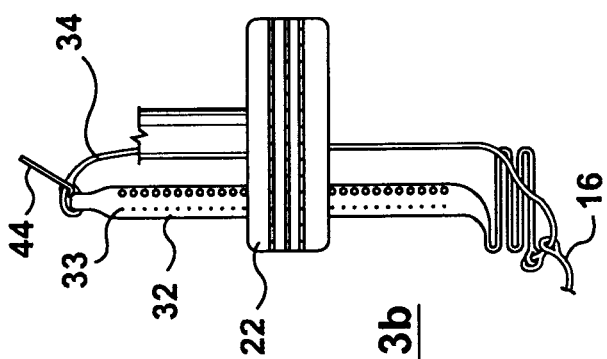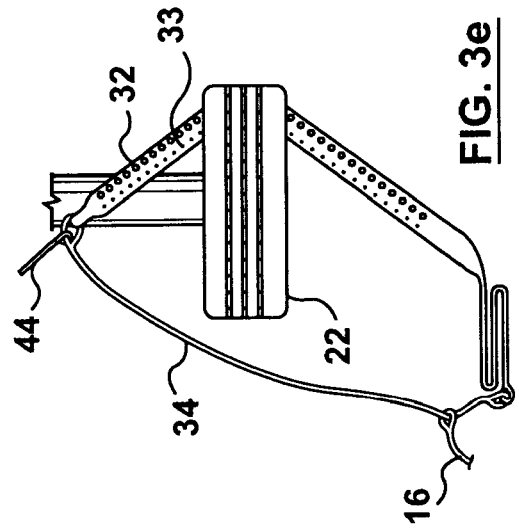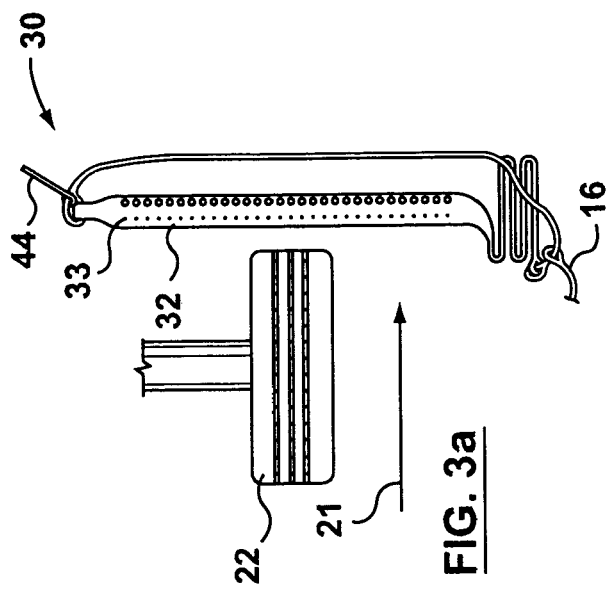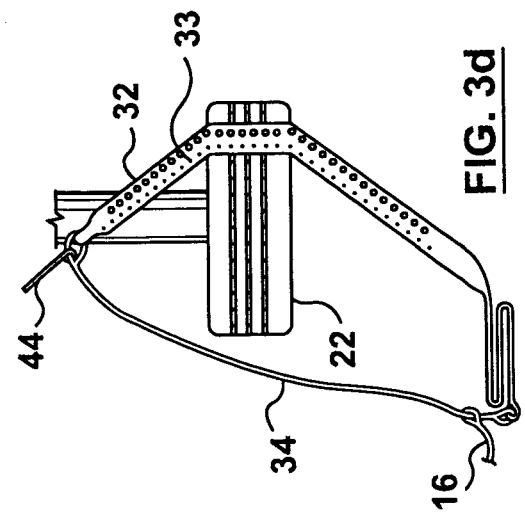

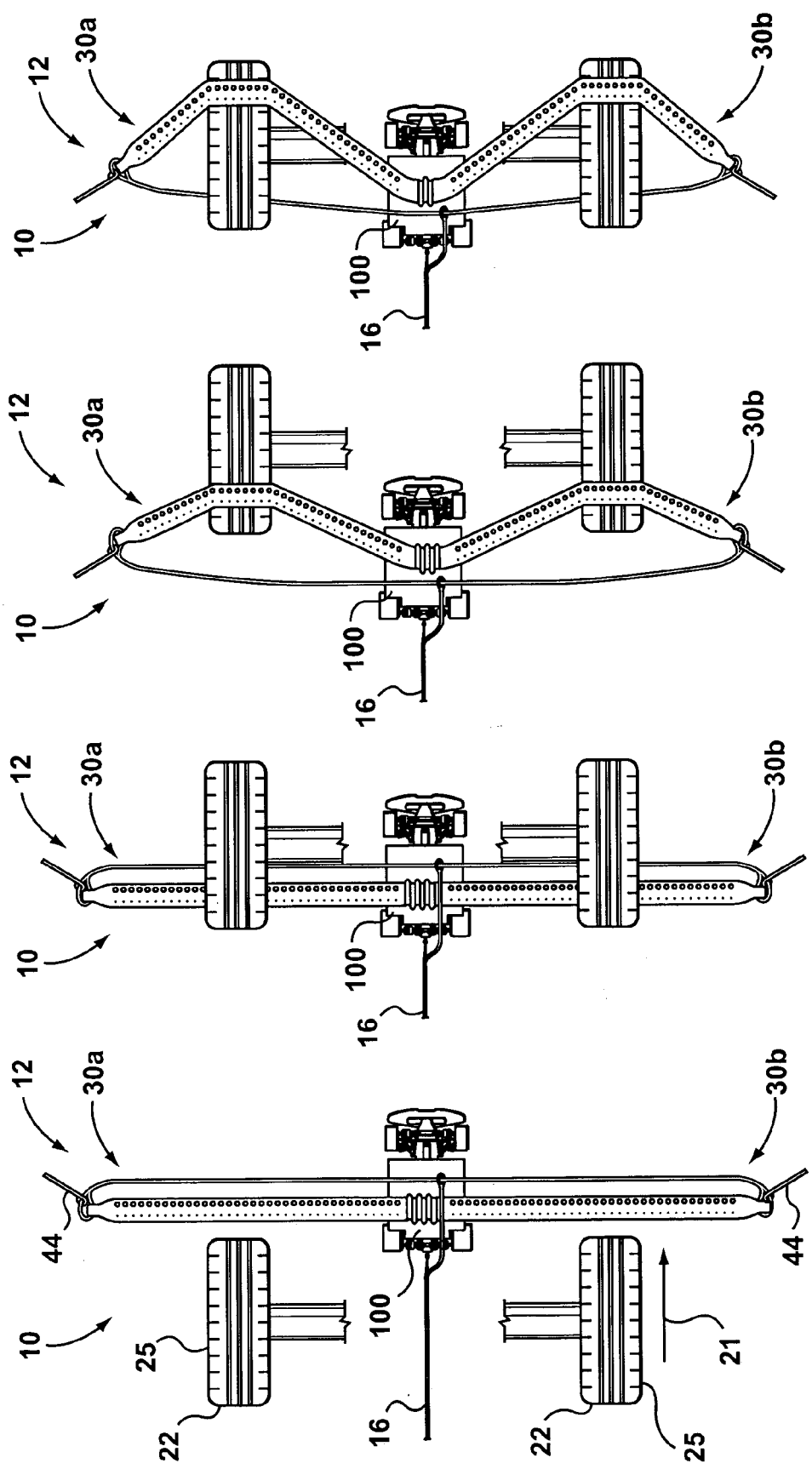

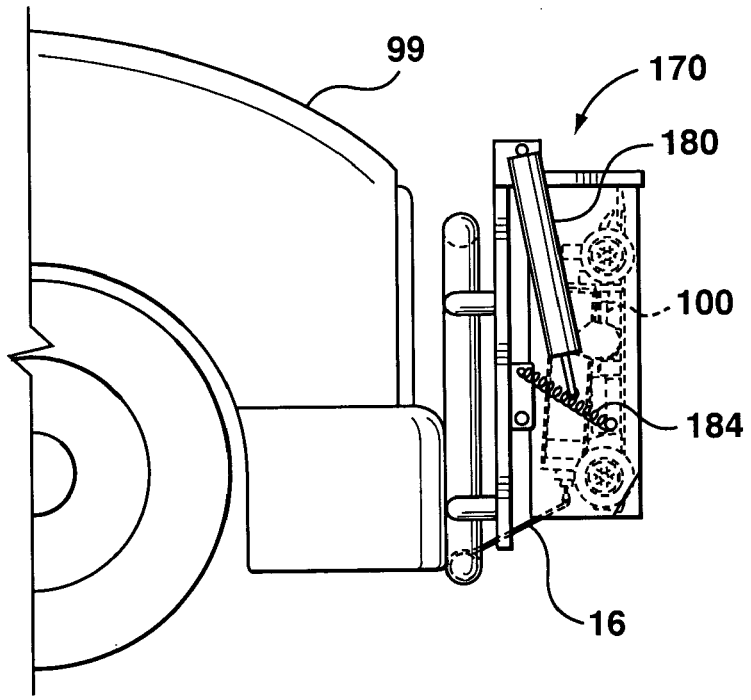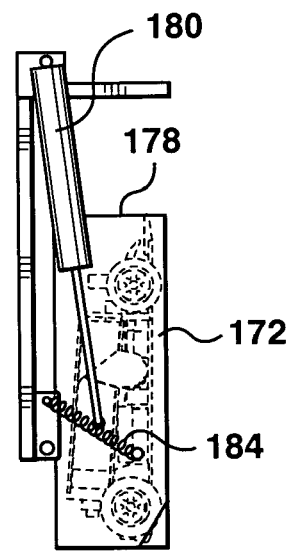
FIG. 17a  FIG. 17b
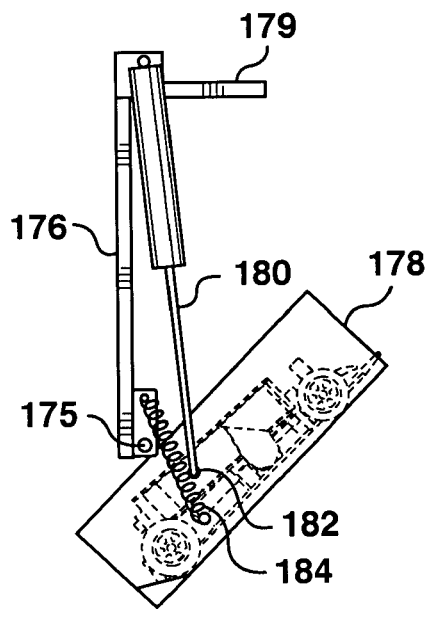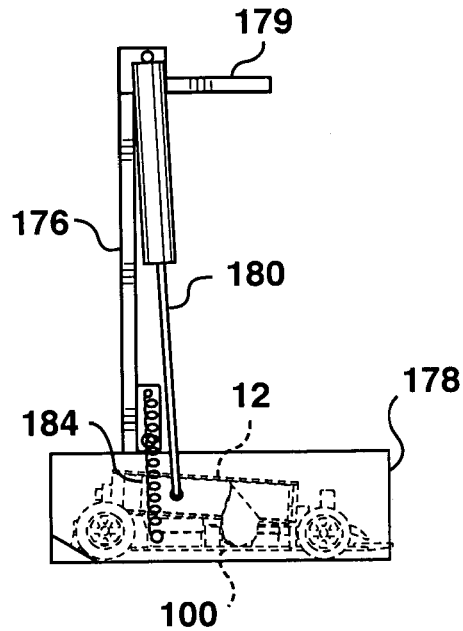
FIG. 17c  FIG. 17d

VEHICLE STOPPING METHOD AND APPARATUS

FIELD OF THE INVENTION

This invention relates to a method and apparatus for stopping a target vehicle.

BACKGROUND OF THE INVENTION

Law enforcement officers are often faced with the task of pursuing suspects in vehicles. Numerous apparatus and methods for stopping fleeing vehicles have been disclosed in the prior art.

One method used in the prior art deploys various types of spike belts to puncture the tires of a vehicle, as in U.S. Pat. Nos. 5,330,285, 5,536,109, and 6,048,128.

Another method used in the prior art delivers an electrical pulse to the engine of the fleeing vehicle. The electrical pulse can be provided either from a pursuing police car or from a fixed position along the road, as disclosed in U.S. Pat. Nos. 4,619,231, 4,976,862, and 5,503,059.

A further method disclosed in the prior art requires that all vehicles be equipped with some form of receiver and engine shut off device, so that a police officer could disable the vehicle by remote transmission. Such systems are described in U.S. Pat. Nos. 4,619,231, and 6,135,226.

An additional method for stopping a vehicle is to mount some sort of grappling apparatus to the front of a police car. The apparatus is designed to engage the bumper or undercarriage of the fleeing vehicle. One such system is disclosed in U.S. Pat. No. 5,839,759.

SUMMARY OF THE INVENTION

It is an object of this invention to improve upon the prior art. It is another object of this invention to provide methods and apparatus for stopping a target vehicle.

In a first aspect of the invention the apparatus is provided with a tire snare, an anchoring device and a tether, the tether having a first end connected to the tire snare and a second end connected to the anchor. The tire snare has at least one capture loop for deploying across the path of a target vehicle. The capture loop is larger than a tire of a target vehicle so that a tire can pass through the capture loop. The capture loop has first and second opposed portions, and the first portion has at least one protrusion for catching the surface of a passing tire. The second portion of the capture loop has a generally non-adhering surface allowing a passing tire to roll over the second portion leaving the second portion in place. The second portion of the capture loop has sufficient width to span and extend beyond the width of a passing tire.

The first portion of the capture loop may comprise an elongate strip of material, and may be constructed of para-aramid fibres, such as KEVLAR® brand aramid fibers.

The at least one protrusion of the first portion of the capture loop may include spikes for embedding in a passing tire. The spikes may have barbs for helping to retain the spike in a passing tire.

The second portion of the at least one capture loop may also be constructed of a material comprising para-aramid fibres, and may be constructed of a braided rope of TECHNORA® brand aramid fibers.

The anchoring device of the vehicle stopping apparatus may be equipped with a brake.

The tether of the vehicle stopping apparatus may be constructed of material comprising para-aramid fibres, and may have a shock cord portion constructed of a resilient material.

The vehicle stopping apparatus may further be provided with a deployment mechanism having at least one bay, an ejector pin attached to each capture loop, and at least one ejector pin firing device. The tire snare of the vehicle stopping apparatus may have a set position so that the tire snare, when in the set position, is stowed in the at least one bay. The apparatus may further have restraint means for holding the tire snare in the set position until deployment. The restraint means may be thread tied around the tire snare when the tire snare is in the set position.

The ejector pins of the deployment mechanism may be of metal construction and may have eyes for attaching the ejector pins to each capture loop of the tire snare. The ejector pin firing device may have a chemical propellant and an electrical resistant element for igniting the propellant. The propellant may be a charge of gun powder.

The vehicle stopping apparatus may further be provided with at least one sensor for detecting the presence and absence of a tire of a target vehicle.

In one embodiment the deployment mechanism of the vehicle stopping apparatus may be fixed in a stationary position, and the anchoring device may have a base which is securely fixed to the ground. The anchoring device may further have a spool around which a length of the tether may be wound. A braking mechanism may operatively be connected to the spool. The braking mechanism may have an actuator and the actuator may be operably connected to the spool. The actuator may be a hydraulic pump.

In another embodiment of the invention, the vehicle stopping apparatus may comprise a mobile delivery device and the deployment mechanism may be mounted on board the mobile delivery device. The mobile delivery device may have a frame with wheels and be of sufficiently small size to pass between the rear wheels of a target vehicle. The mobile delivery device may have steerable front wheels. The vehicle stopping apparatus may further be provided with a guidance system operatively connected to the steerable front wheels of the mobile delivery device. The guidance system may comprise at one gyroscope mounted on board the mobile delivery device and at least one servo motor mechanically linked to the steerable front wheels of the mobile delivery device.

The vehicle stopping apparatus may further be provided with a launching mechanism for dispatching the mobile delivery device. The launching mechanism may be fixed to a vehicle in pursuit of a target vehicle. The launching mechanism may be provided with a launch aiming system, which may include guide rods fixed to a launch platform and slidingly engaged by tubes fixed to the delivery device. The delivery device may have at least one on board propulsion device. The propulsion device may be a solid fuel rocket engine. The anchoring device may be a vehicle in pursuit of a target vehicle.

BRIEF DESCRIPTION OF THE DRAWINGS

For a better understanding of the present invention and to show more clearly how it would be carried into effect, reference will now be made by way of example, to the accompanying drawings that show a preferred embodiment of the present invention, and in which:

FIGS. 3a–3f are sequential figures showing in top view the interaction of a deployed tire snare according to one embodiment of the present invention with a wheel of a target vehicle as the wheel travels over the deployed tire snare;

FIGS. 13a–13f are sequential figures in top view showing the interaction of the tire snare portion of the apparatus of FIG. 9 and the tire of a target vehicle as the target vehicle travels over the deployed tire snare;

FIGS. 17a–17d are side views showing sequentially the movement of the enclosure of the device of FIGS. 16a and 16b between the vertical position and the horizontal position;

DETAILED DESCRIPTION OF THE INVENTION

Figure 1:
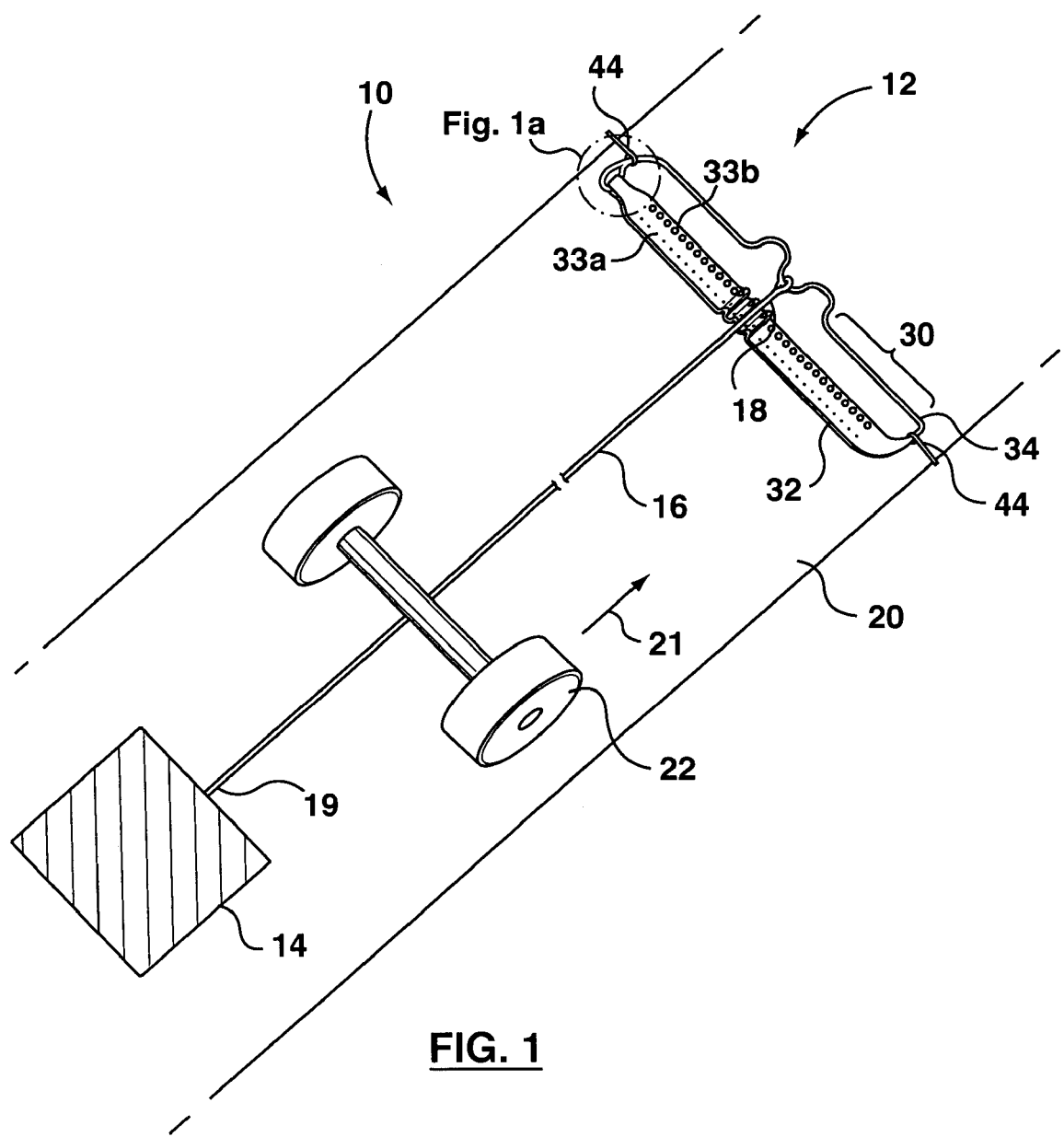
FIG. 1 is a perspective view of one embodiment of a vehicle stopping apparatus according to the present invention, having a tire snare shown deployed on a road surface across the path of an oncoming target vehicle.

A vehicle stopping apparatus according to the present invention is shown generally in the FIGS at 10. Referring to FIG. 1, the apparatus 10 comprises a tire snare 12, an anchoring device 14, and a tether 16. The tether 16 has a first end 18 connected to the tire snare 12, and a second end 19 attached to the anchoring device 14.

In FIG. 1, the tire snare 12 is shown in its deployed position on a road surface 20 and across the path of oncoming tires 22 of a target vehicle (not shown), traveling in the direction indicated by arrow 21. The tire snare 12 has at least one capture loop 30. The capture loop 30 has a first portion 32 and a second portion 34 which, when in the deployed position, are positioned substantially opposite to each other.

Figure 2:
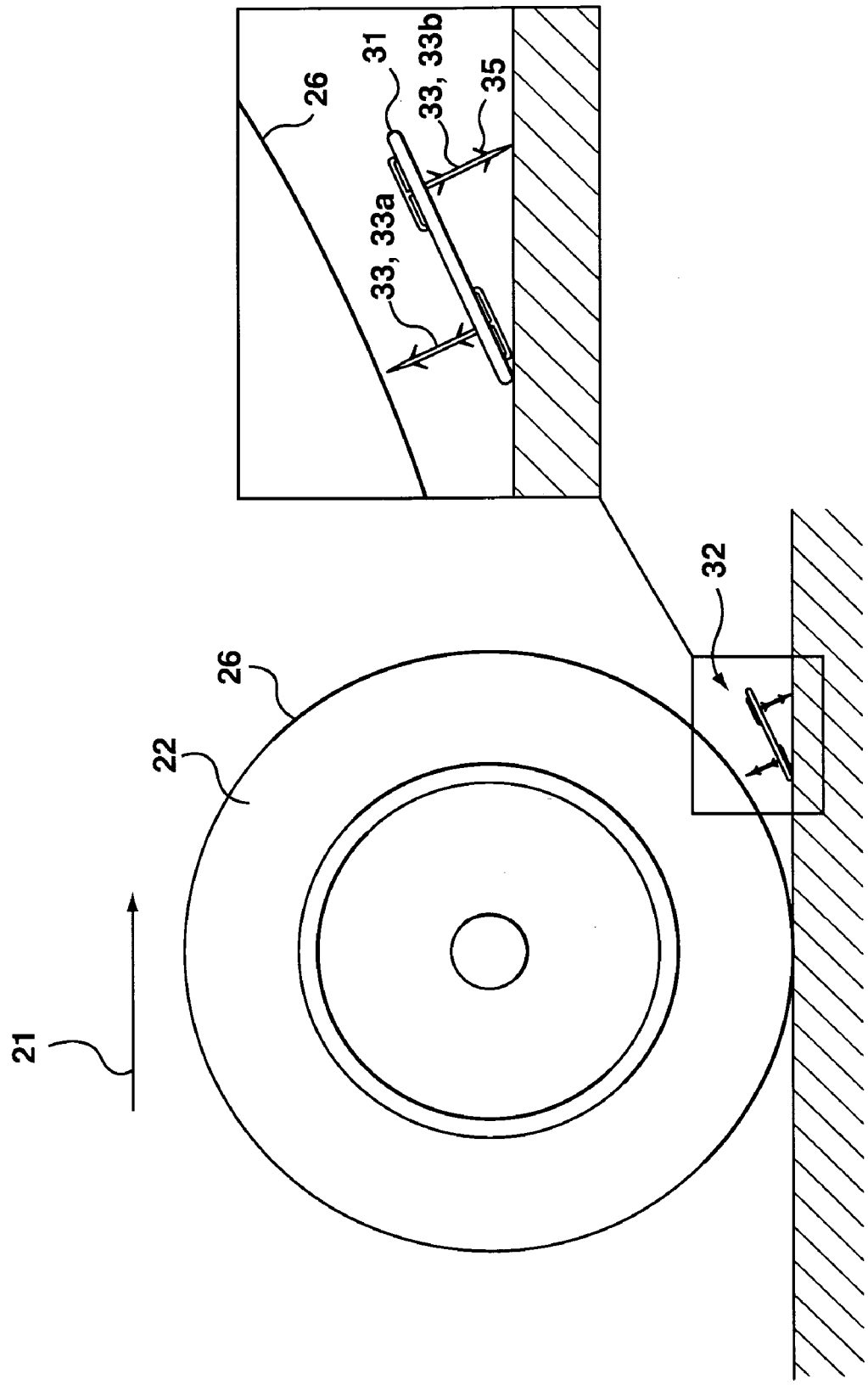
FIG. 2 is a side view of a portion of the tire snare of FIG. 1.

Referring now to FIGS. 1 and 2, the first portion 32 of the capture loop 30 may be constructed of an elongate strip 31 of high-strength material. A suitable material for the elongate strip 31 may be, for example, but not limited to, material comprising para-aramid fibers, such as KEVLAR® brand aramid fibers. The first portion 32 (also called the active portion) of the capture loop 30 is provided with attaching means 33 for attaching the first portion 32 to the surface 26 of the tire 22. The attaching means 33 can include, for example, but not limited to, at least one protrusion that can be in the form of a spike to catch the surface 26 of tire 22 as the tire 22 rolls over the first portion 32. The spikes 33 can imbed themselves in the tire material (typically rubber) as the tire 22 passes over the capture loop 30. Other forms of attaching means are contemplated by this invention, such as, for example, but not limited to, hooks, suction cups, or adhesives.

In the embodiment illustrated, two spaced-apart rows of protrusions in the form of spikes 33 are provided along the length of elongate strip 31. Spikes 33a in a first row are directed in one direction away from strip 31, and spikes 33b in a second row are directed in substantially the opposite direction. The opposite orientation of the spikes 33a and 33b ensures that one row of spikes 33 will be facing upwards, regardless of which side of the strip 31 is facing up (or away from the road surface 20) when the capture loop 30 is deployed. Also, by spacing the rows of spikes 33a and 33b apart from each other, the row of spikes 33 facing upwards can be oriented at an incline facing the approaching tire 22. This orientation can reduce the chance of spikes 33 merely being folded over by tire 22, but rather, facilitates the spikes 33 becoming imbedded in the tire 22. Furthermore, the spikes 33 may be provided with barbs 35 to help keep spikes 33 in tire 22 after penetrating the surface 26.

The second portion 34 (also called the inert portion) of the capture loop 30 has a generally non-adhering surface. The non-adhering surface can be, for example, but not limited to, a length of tubular material with a substantially smooth outer surface along at least a portion of its length. The non-adhering surface of the second portion 34 of the capture loop 30 facilitates the tire 22 in passing over second portion 34 without the second portion 34 becoming attached to tire 22. The second portion 34 of the capture loop 30 can extend continuously from the first portion 32, or the second portion 34 can be a length of material initially separate from but attached to the first portion 32.

In the embodiment illustrated, the second portion 34 of the capture loop 30 is a length of braided rope of TECHNORA® brand aramid fibers that is attached at either end to the first portion 32. The second portion 34 of the capture loop 30 can also comprise, for example, a length of flat webbing that is rolled or folded along its axis into a round or square tubular shape and stitched to hold such shape.

The first portion 32 can have a linear extent that is equal to about one-half the perimeter of the capture loop 30. The second portion can also have a linear extent that is equal to about one-half the perimeter of the capture loop 30. The perimeter of the capture loop is sized so that the capture loop 30 can loop over the tire 22, as will be described in greater detail hereinafter. The minimum perimeter of the capture loop 30, for the illustrated embodiment, is generally defined by twice the diameter plus twice the width of the tire 22 to be ensnared.

Figure 1A:
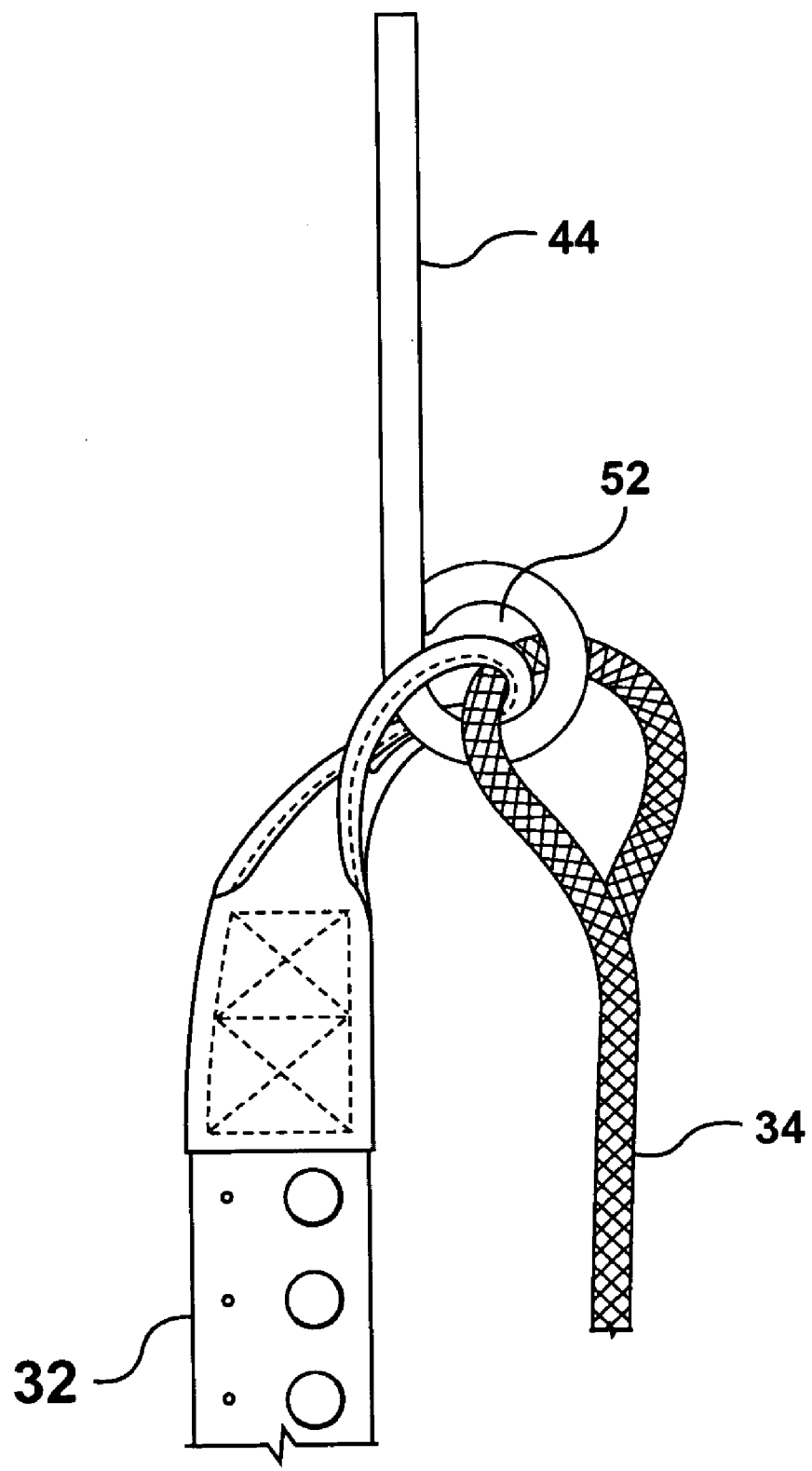
FIG. 1a is an enlarged view of a portion of the apparatus of FIG. 1 showing an attachment connection in greater detail.

Connections between the first portion 32 and the second portion 34 in the illustrated embodiment may be of any suitable high-strength stitching or braiding. For example, with reference to FIG. 1a, the first portion 32 of the capture loop 30 is provided with a fastening hoop at one end that is securely stitched in place using nylon stitching. This first hoop is engaged by a second hoop provided at an adjacent end of the second portion 34 of the capture loop. The second hoop can be formed by turning an end of the second portion 34 back on itself and securing the end by means of a braided rope splice. The hoops of the first and second portions 32, 34 of the capture loop 30 can further engage an eye 52 provided in an ejector pin 44 for deploying the capture loop 30, as further described hereinafter.

The tether 16 may be constructed of a flexible, high strength material such as, for example, but not limited to, rope of TECHNORA® brand aramid fibers or aircraft cable. The connection between the capture loop 30 and the tether 16 may also be provided by looping an end portion of the tether 16 through the capture loop 30 and then back on itself, and securing the looped and portion by means of, for example, but not limited to, a braided rope splice or a crimp fastener.

Referring now to FIGS. 3a–3f, the interaction of tire snare 12 and a tire 22 of a target vehicle (not illustrated) as the tire 22 passes over tire snare 12 will be described. In FIG. 3a, the tire 22 is shown in a position approaching the deployed capture loop 30. The direction of travel of tire 22 is indicated by arrow 21.

In FIG. 3b, tire 22 is shown immediately after having travelled over the capture loop 30. The protrusions 33 of the first portion 32 of the capture loop 30 have become embedded in the surface 26 of the tire 22.

In FIG. 3c, the first portion 32 of the capture loop 30 has been lifted off of the road surface 20 (not shown) as a result of the attachment of the first portion 32 to the surface 26 of the tire 22 by the protrusions 33. As the tire 22 continues to rotate while travelling forward, the first portion 32 of the capture loop 30 is carried over the top of tire 22 so that it is looped completely over the tire 22 (FIGS. 3d and 3e).

Depending on the amount of slack provided by the capture loop 30 and the tether 16, the first portion 32 may be pulled taut after looping over the tire 22 just once. As can be appreciated from FIG. 3f, as the first portion 32 is pulled taut, the spikes 33 can be ripped free from the tire 22. Alternatively, the first portion 32 may wrap around the tire 22 several times as the tire 22 continues to roll forward, until eventually no slack remains and the first portion 32 is pulled taut. In either case, the first portion 32 will generally be ripped free from the tire 22 as the first portion 32 is pulled taut, and the capture loop 30 will have become wrapped around the inboard wheel assembly (shown in the figures simply as axle 28) supporting the tire 22.

The spikes 33 and barbs 35 can, but need not, be sufficiently large to cause the tire 22 to deflate when ensnared by the tire snare 12. In the embodiment illustrated, the length of the spikes 33 and the size of the barbs 35 are small enough so that little or no damage is inflicted on the tire 22. In other words, when the spikes 33 become imbedded in the tire 22, and when first portion 32 is subsequently ripped free from tire 22, actual damage to the tire 22 is generally minimal. This can advantageously ensure that the tires 22 of the target vehicle (or any other vehicle if inadvertently ensnared by the capture loop 30) remain in satisfactory operating condition, and in particular, remain inflated. As a result, sudden loss of control of an ensnared vehicle can be avoided so that a safe, controlled stop is possible.

Figure 4:
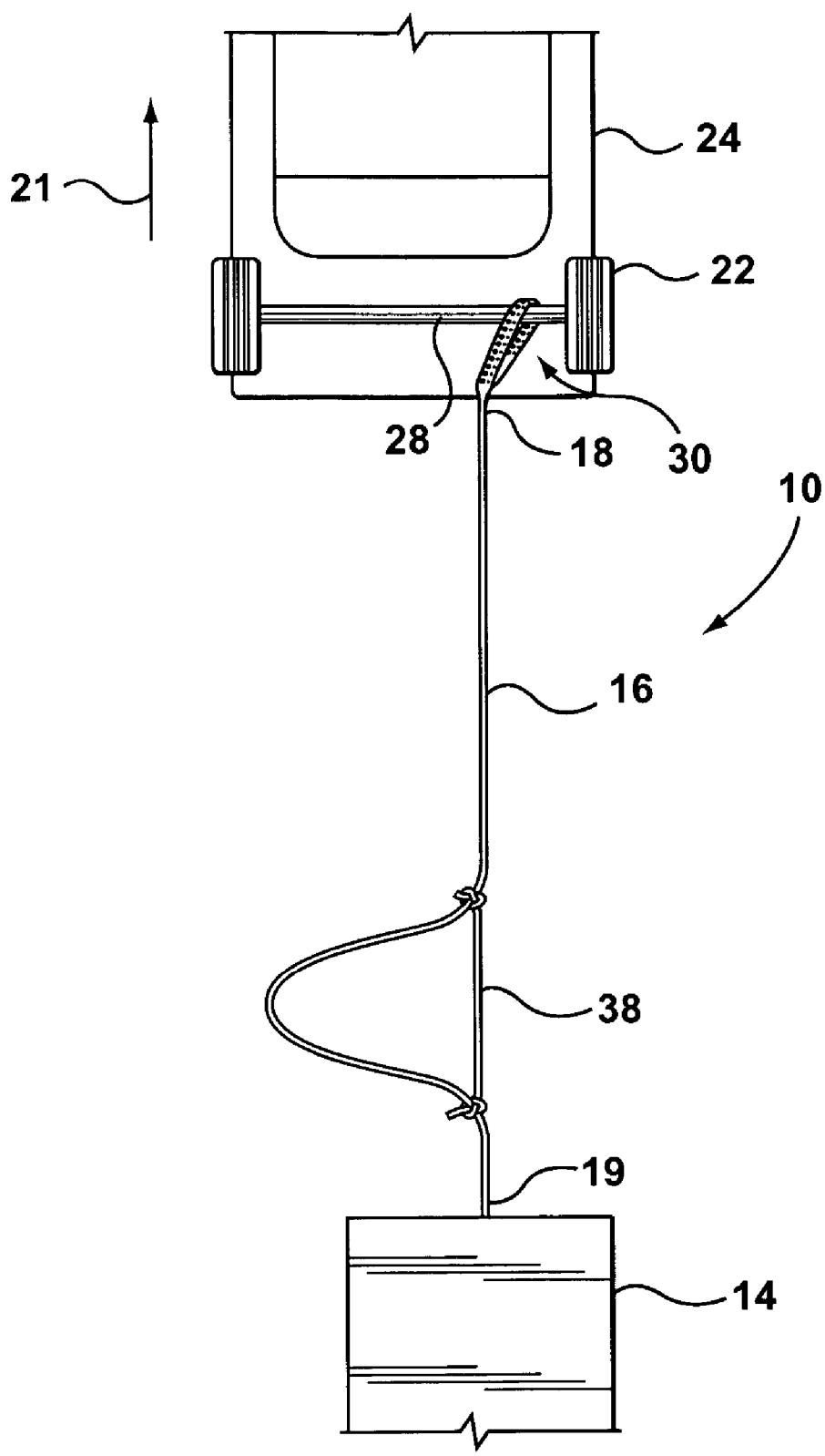
FIG. 4 is a top view of the apparatus of FIG. 1 after having captured a target vehicle.

FIG. 4 shows the capture loop 30 looped around the axle 28 with the tether 16 secured to, and trailing, the target vehicle 24. In FIG. 4, the anchoring device 14 is depicted schematically as a block to which the second end 19 of the tether 16 is attached. By applying resistance to forward movement of the tether 16, the target vehicle 24 to which the tether 16 has become secured can be brought to a stop. Accordingly, anchoring device 14 may be a structure solidly fixed to the ground, allowing target vehicle 24 to travel no further than the total length of tether 16. Alternatively, anchoring device 14 may be a police cruiser traveling behind target vehicle 24, which, upon application of its brakes, can force the target vehicle 24 to a stop. In general terms, the anchoring device 14 acts to arrest further travel of target vehicle 24, by applying a resistive force on the tether 16.

To help rein in the target vehicle 24, the tether 16 may be provided with a shock cord 38, comprising a length of resilient material. The shock cord 38 may be provided integrally along the length of the tether 16, or may, as shown in FIG. 4, be attached at two points along the length of the tether 16 so as to reduce the distance between ends 18 and 19 of the tether 16 when the shock cord 38 is in its relaxed, contracted state. The forward motion of the target vehicle 24 relative to the anchoring device 14 is arrested less abruptly than would be the case without shock cord 38. A certain amount of kinetic energy of the target vehicle is consumed in the process of extending the shock cord 38. This can be particularly advantageous in cases where the tether 16 is of a material with very low elasticity which could break upon sharp application of a high stress load.

Figure 5:
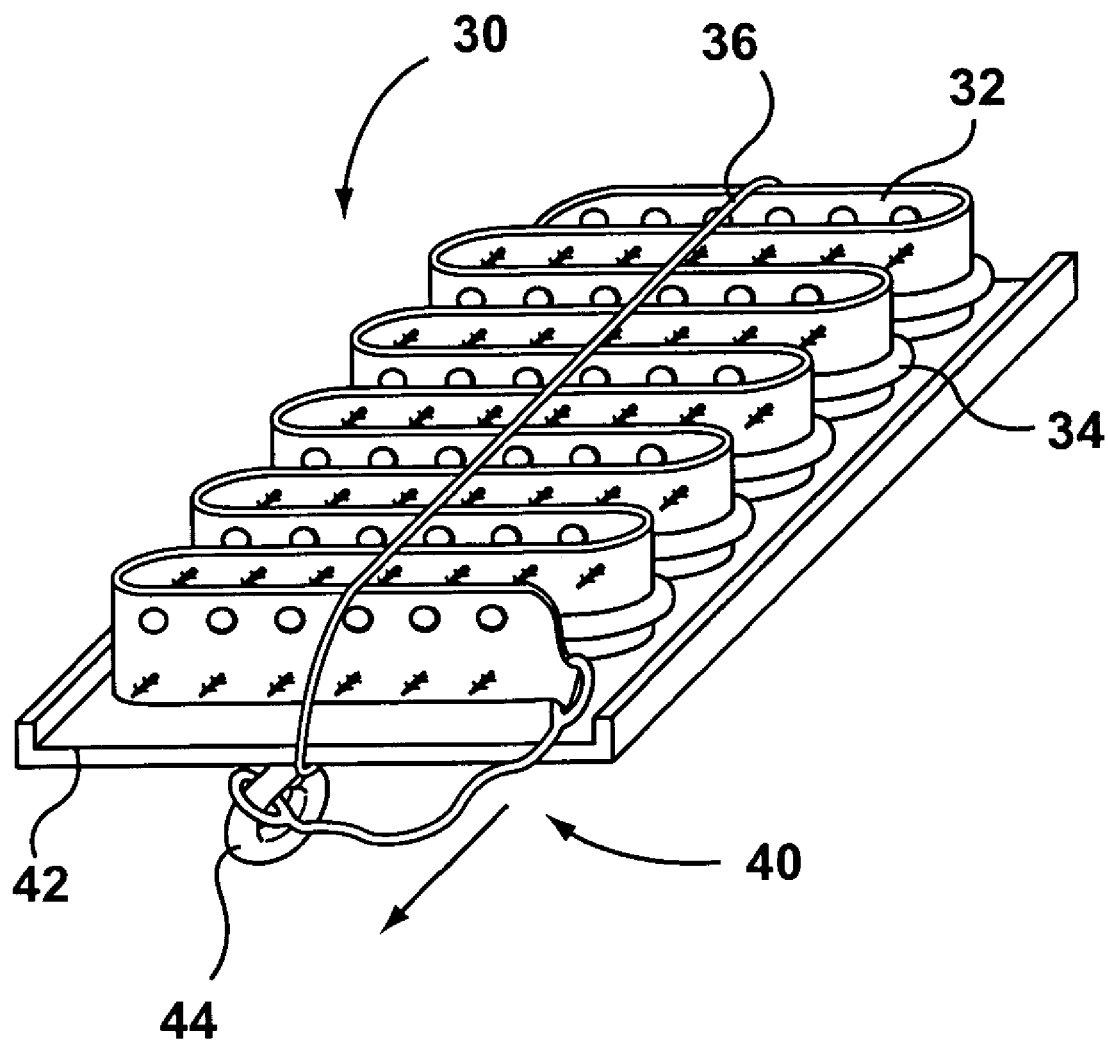
FIG. 5 is a perspective view of an embodiment of a deployment mechanism according to the present invention.
Figure 6:
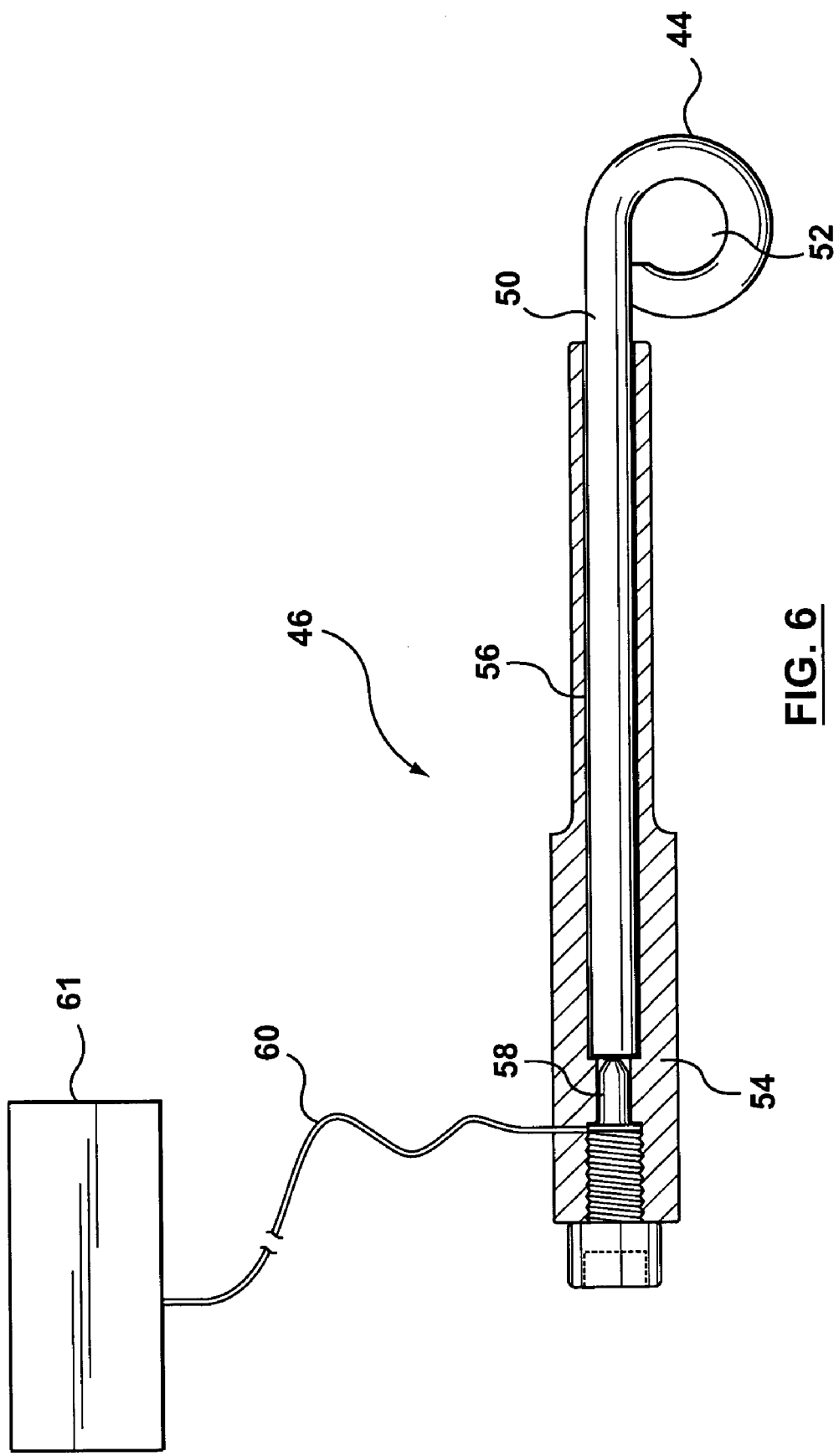
FIG. 6 is a detail view of one portion of the mechanism of FIG. 5.

Referring now to FIGS. 5 and 6, the apparatus of this invention may further comprise a deployment mechanism 40 for deploying the capture loop 30 of the tire snare 12. The deployment mechanism 40 can have a bay 42 for storing the capture loop 30 in its set position. As illustrated, the first portion 32 and the second portion 34 of capture loop 30 are carefully interlaced in a folded, fan-like bundle in the set position. This bundled arrangement facilitates tangle-free deployment of the capture loop 30 from the set position to the deployed position. To hold the capture loop 30 in the set position, a releasable bundle restraint 36 may be provided. The bundle restraint 36 may be, for example but not limited to, a length of thread wrapped around the capture loop 30 in its set position. The thread of the bundle restraint 36 can easily break to permit deployment of capture loop 30, as will hereinafter be described.

The deployment mechanism 40 may further be provided with an ejector pin 44 and an ejector pin firing device 46. Ejector pin 44 may have an elongate shaft 50, curved over at one end to form an eye 52. For the embodiment illustrated, eye 52 serves as an attachment point to which capture loop 30 can be securely fastened.

In one embodiment, ejector pin firing device 46 has an ejector barrel 54 in which a longitudinal bore 56 is provided. Bore 56 is sized to accommodate shaft 50 of ejector pin 44 in sliding fit. Firing device 46 is provided with, at the base of bore 56, a chemical propellant 58, such as, for example but not limited to, a charge of gunpowder. An electrical igniter 60 extends from propellant 58 to a controller 61.

To deploy capture loop 30, ejector pin firing device 46 is actuated by an electrical signal sent from controller 61 to igniter 60. The electrical signal detonates propellant 58 and fires ejector pin 44 out of barrel 54. Since capture loop 30 is attached to ejector pin 44, capture loop 30 is pulled outward with ejector pin 44. The pulling force overcomes the releasable bundle restraint 36, allowing capture loop 30 to extend to its deployed position. In the embodiment illustrated, bundle restraint 36 is a thread which breaks under the pulling force exerted on capture loop 30 by ejector pin 44.

Figure 7B:
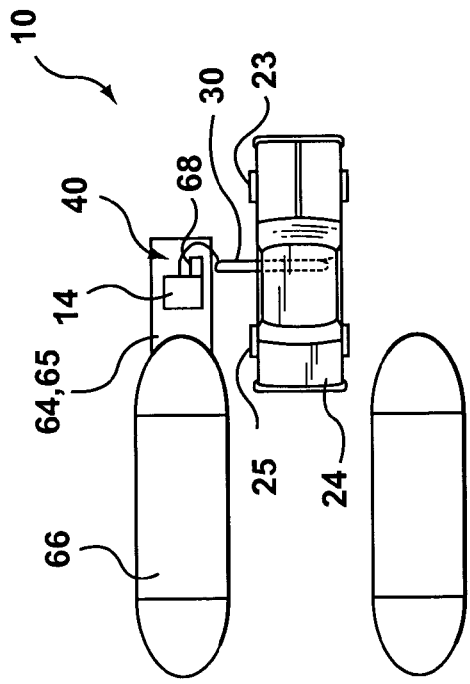
FIGS. 7a–7c are sequential figures showing in top view the deployment of a tire snare and subsequent apprehension of a target vehicle according to one embodiment of the apparatus of the present invention in a stationary deployment application.
Figure 7A:
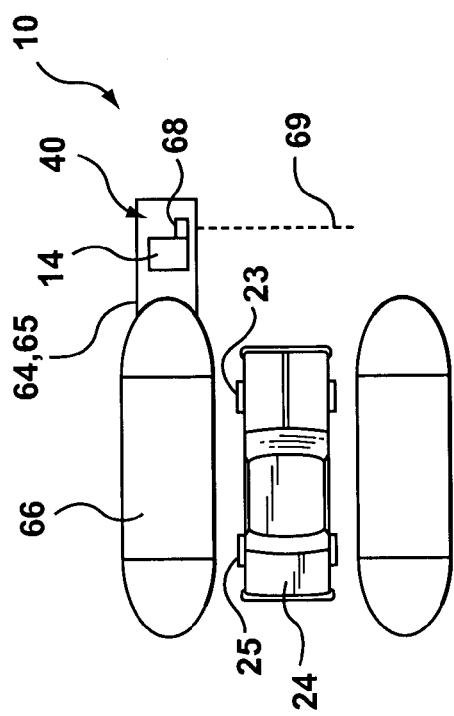
Figure 7C:
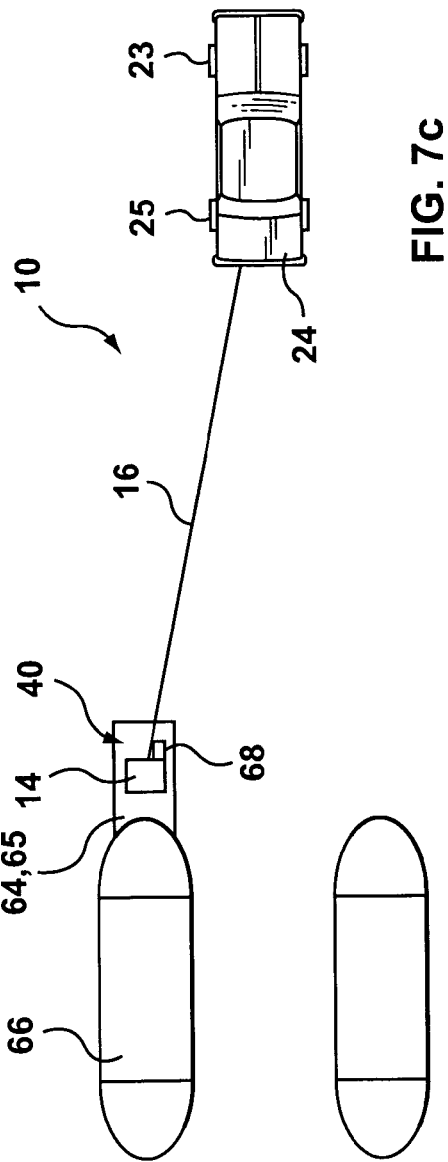

Referring now to FIGS. 7a–7c, use of the apparatus of the present invention in a stationary application is described. In this embodiment, deployment mechanism 40 is fixed in a stationary position, adjacent road surface 20 (not shown). Anchoring device 14 may comprise a structure fixed in a stationary position, and may have a base 64 in the form of a concrete bollard 65 extending into the ground. Bollard 65 may form part of a traffic control island 66 for guiding vehicles through check points and the like.

Referring again to FIGS. 7a–7c, deployment mechanism 40 can be equipped with a sensor 68 operatively connected to controller 61 to detect tires 22 of a passing vehicle 24. In the embodiment illustrated, sensor 68 casts a beam 69 across the path along which a vehicle 24 would typically travel. The beam 69 can be at a height to be triggered by a tire 22 of the vehicle 24. By detecting when the tire 22 of the front wheel 23 has passed sensor 68, firing the ejector pin 44 to deploy capture loop 30 can be appropriately timed to ensnare the tire 22 of the rear wheel 25 of the target vehicle 24.

Appropriately timing the firing of the ejector pin 44 can be described by the following example, with reference to FIGS. 7a–7c. Upon approach of a target vehicle 24, controller 61 watches for an input signal from sensor 68, indicating the presence of the front wheel 23 of target vehicle 24 (FIG. 7a). After first detecting the presence of front wheel 23, controller 61 waits for sensor 68 to switch back to the "tire-absent" state, indicating that front wheel 23 has passed (FIG. 7b). At that point, the gap between the front wheels 23 and the rear wheels 25 of target vehicle 24 has been "detected." This gap presents an appropriate window within which the capture loop 30 can be deployed. Accordingly, controller 61 sends an output signal to igniter 60, thereby detonating propellant 58 and deploying tire snare 12. Capture loop 30 of tire snare 12 is thereby positioned in the path an advancing tire 22 of rear wheels 25 of target vehicle 24, and interacts with the tire 22 as described previously (FIGS. 3a–3f). Tether 16 is thereby securely attached to target vehicle 24 (FIG. 7c), and anchoring device 14 may then be used to bring target vehicle 24 to a stop.

Figure 8:
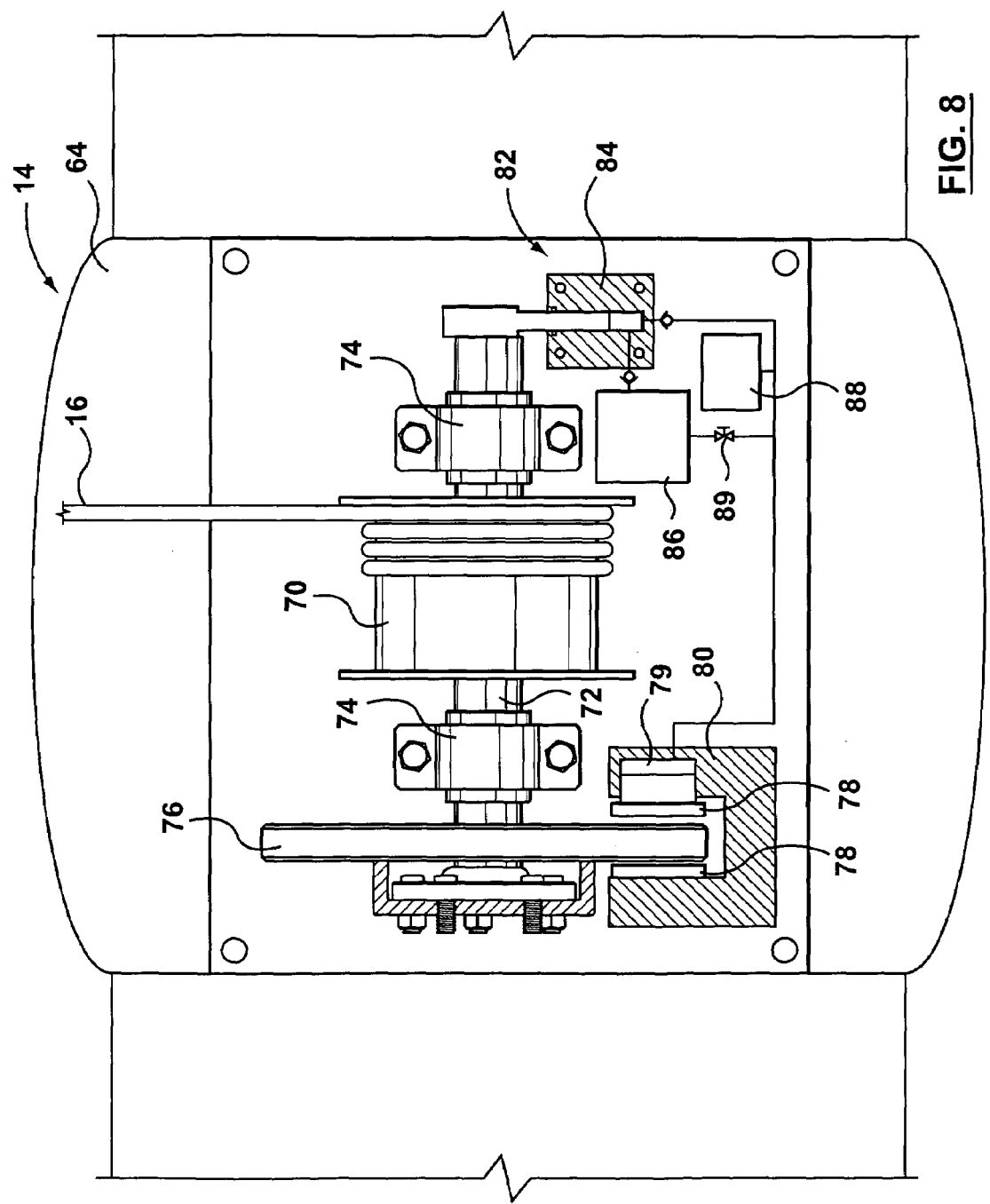
FIG. 8 is a top view of the anchoring device of FIGS. 7a–7c.

Referring now to FIG. 8, further details of an embodiment of an anchoring device 14 for use in stationary applications will now be provided. Anchoring device 14 may have a spool 70 about which tether 16 may be wound. In one embodiment, spool 70 is mounted on a shaft 72 which is supported on either side of spool 70 by bearings 74. Also attached to shaft 72 is a brake rotor 76 which spins between brake shoes 78 mounted in caliper 80. By activating caliper 80, shoes 78 bear against rotor 76, thereby stopping rotation of rotor 76 and shaft 72. This consequently stops the unwinding of tether 16 from spool 70, which brings target vehicle 24 to a stop when the first end 18 of the tether 16 has been secured to the target vehicle 24, as described previously.

Caliper 80 of anchoring device 14 may be actuated hydraulically by hydraulic system 82. Hydraulic system 82 has a hydraulic pump 84, an oil reservoir 86, and an accumulator 88. Pump 84 may be driven by shaft 72, so that pump 84 is automatically powered by the unwinding of tether 16 from spool 70 as target vehicle 24 drives away in the moments immediately following capture of tire 22 in tire snare 12. Rotation of shaft 72 causes pump 84 to pump oil into at least one brake cylinder 79 located behind at least one brake shoe 78. This forces brake shoe 78 forward and against rotor 76, causing rotor 76 to stop. Pressure in brake cylinder 79 is maintained by accumulator 88. Brake shoes 78 may be released by actuating valve 89, to allow oil to flow back from cylinder 79 to reservoir 86.

To use the apparatus of the present invention in a stationary application as described above, it is appreciated that not every vehicle passing apparatus 10 may need to be stopped. To selectively stop a vehicle, the system must first be armed, and to allow a vehicle to pass, the system must be disarmed. The arming and disarming of apparatus 10 may be performed manually by an authorized operator, or automatically in response to certain conditions, such as, for example, but not limited to, payment of a toll or insertion of a pass card.

Figure 9:
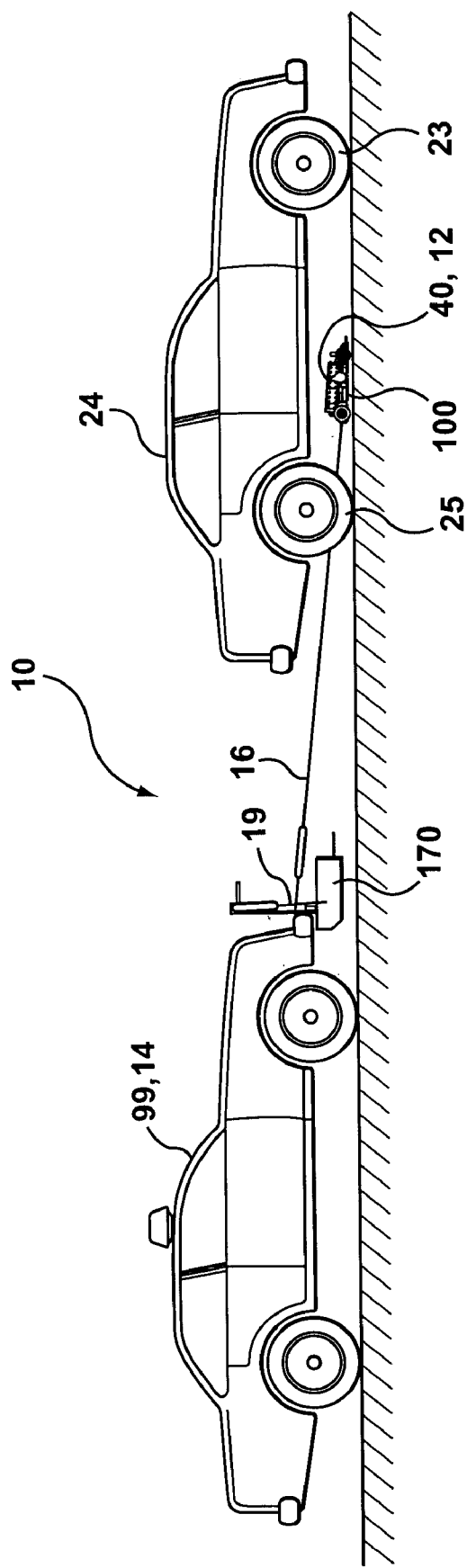
FIG. 9 is a side view of the apparatus of FIG. 1 shown having a mobile delivery device.

Referring now to FIG. 9, use of apparatus 10 in a mobile deployment application is described. For use in such applications, apparatus 10 may further be provided with a mobile delivery device 100 to which deployment mechanism 40, with capture loop 30 of tire snare 12, may be mounted.

Figure 10:
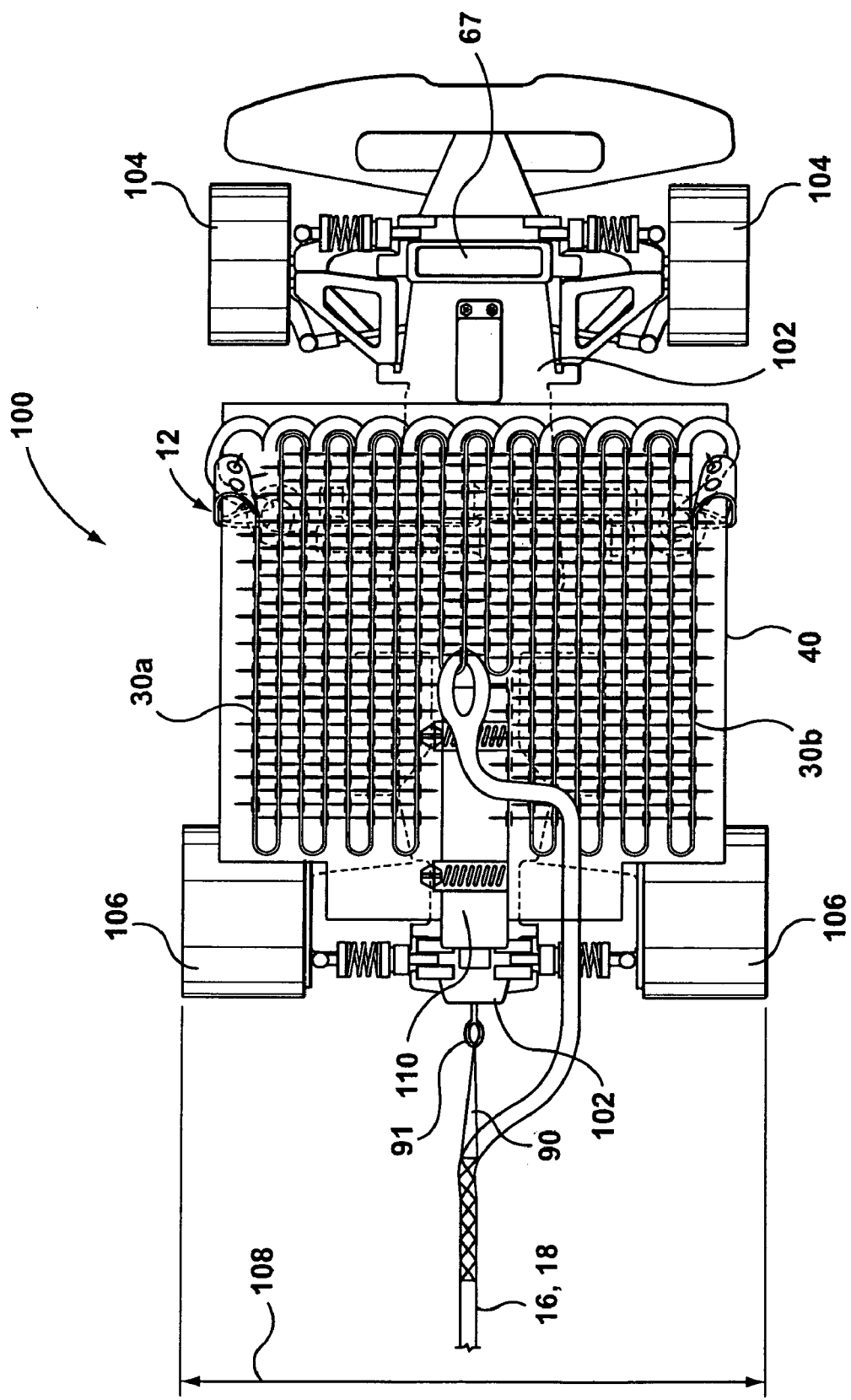
FIG. 10 is a top view of the mobile delivery device of FIG. 9.
Figure 11:
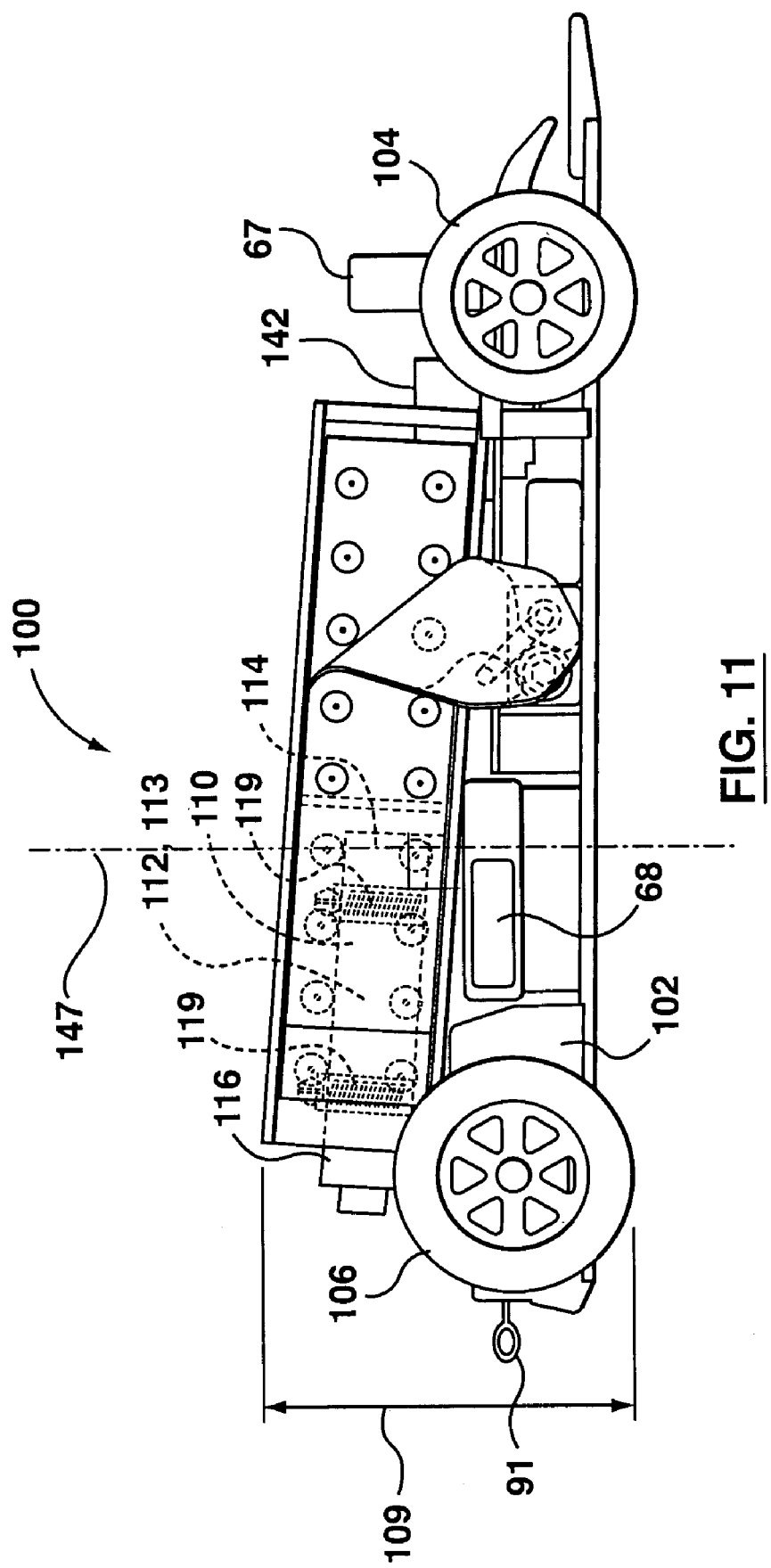
FIG. 11 is a side view of the mobile delivery device of FIG. 9.

Referring now to FIGS. 10 and 11, delivery device 100 may have the chassis of a radio controlled model car, having a frame 102, front wheels 104, and rear wheels 106. In the embodiment illustrated, the overall width 108 and height 109 of mobile delivery device 100 is such that delivery device 100 can pass underneath target vehicle 24, between its front wheels 23 or rear wheels 25.

Figure 12A:
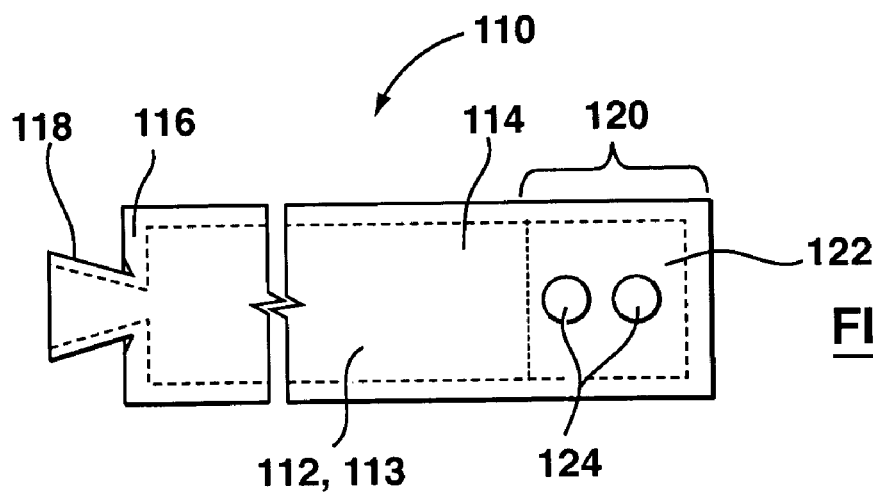
FIGS. 12a and 12b are side and top views, respectively, of a propulsion device for use with the mobile delivery device of FIG. 9.
Figure 12B:
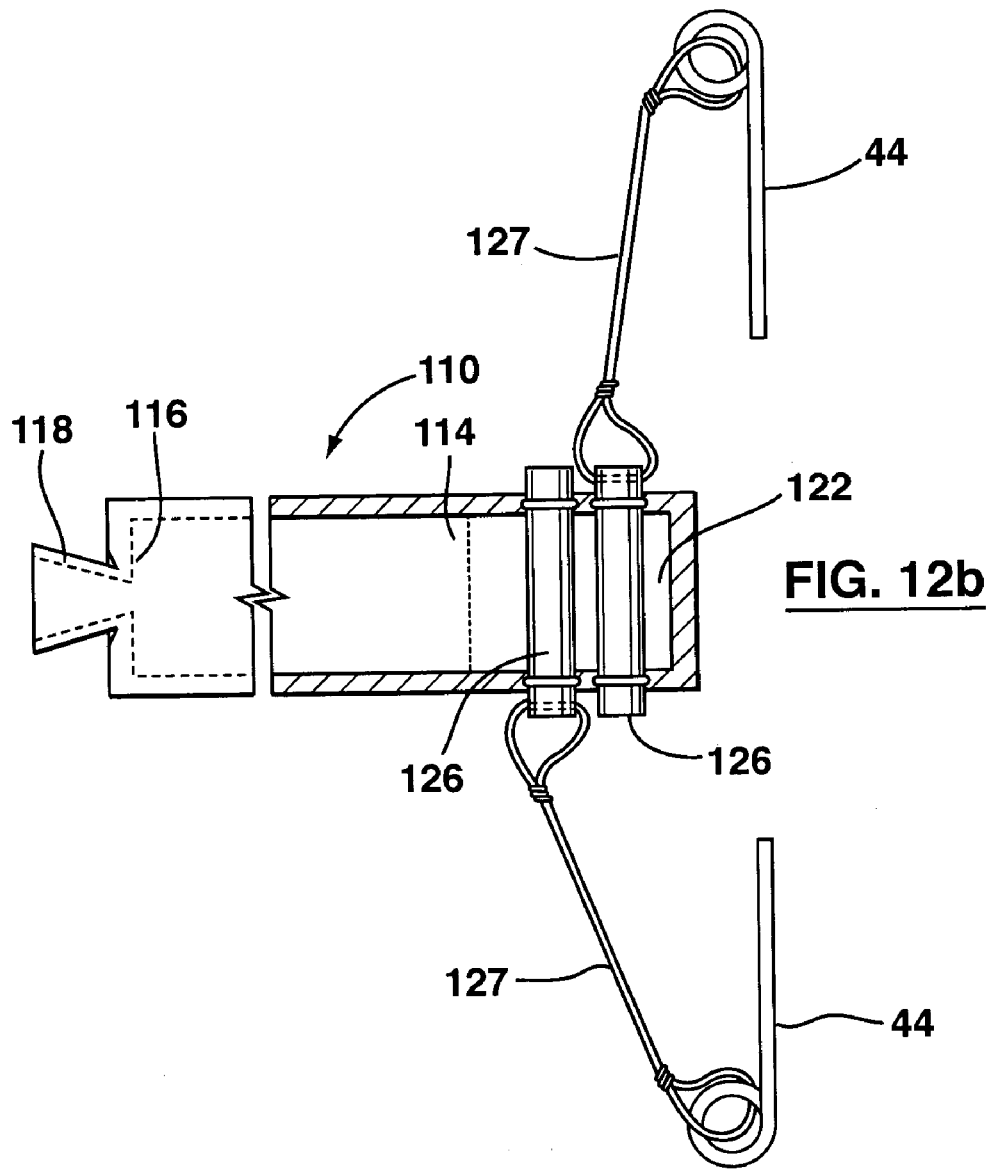

Referring now to FIGS. 11, 12a, and 12b, mobile delivery device 100 may have an on-board propulsion device 110 which may be, for example, but not limited to, a solid fuel rocket engine. With reference to FIG. 11, in an embodiment where propulsion device 110 is a rocket engine, propulsion device 110 may be substantially cylindrical, mounted on delivery device 100 so that the longitudinal axis of engine 110 is generally parallel with the direction of travel of delivery device 100. As best seen in FIGS. 12a and 12b, the engine 110 has a core 112 disposed between front end 114 and rear end 116 of engine 110. Core 112 may contain solid fuel 113. An exhaust nozzle 118 may extend from rear end 116 of engine 110 to increase the thrust generated by engine 110. Engine 110 can be securely fastened to frame 102 of delivery device 100 by clamps 119, such as, for example, but not limited to, strap clamps as illustrated in FIG. 11.

In use, mobile delivery device 100 may be positioned on the ground behind target vehicle 24, and aimed towards target vehicle 24. By engaging propulsion device 110, delivery device 100 may be propelled towards target vehicle 24, and, if aimed from behind target vehicle 24, delivery device 100 can pass between the rear wheels 25 of target vehicle 24.

Sensor 68 can then detect the presence of rear wheels 25, sending a corresponding signal to controller 61. Once this signal has been received, controller 61 waits for another signal from sensor 68 corresponding to the "tire-absent" state, thereby indicating that mobile deployment device 100 has reached an appropriate deployment position underneath target vehicle 24, between its front wheels 23 and rear wheels 25. Duplicate sensors 68 may also be used, wherein one sensor 68 detects the left rear wheel 25, while a second sensor 68 detects the right rear wheel. In addition, an under-vehicle sensor 67 may be used to detect the overhead presence of target vehicle 24. Requiring detection signals from each duplicate sensor 68 and sensor 67 can guard against faulty deployment of the tire snare 12. The controller 61 must read the presence of the left and right rear wheels, then read absence of these wheels, all while the sensor 67 signals presence of the underside of the target vehicle 24.

These sensor signal conditions must be satisfied in order for the controller 61 to recognize that the delivery device 100 has arrived at its deployment position.

Figure 13F:
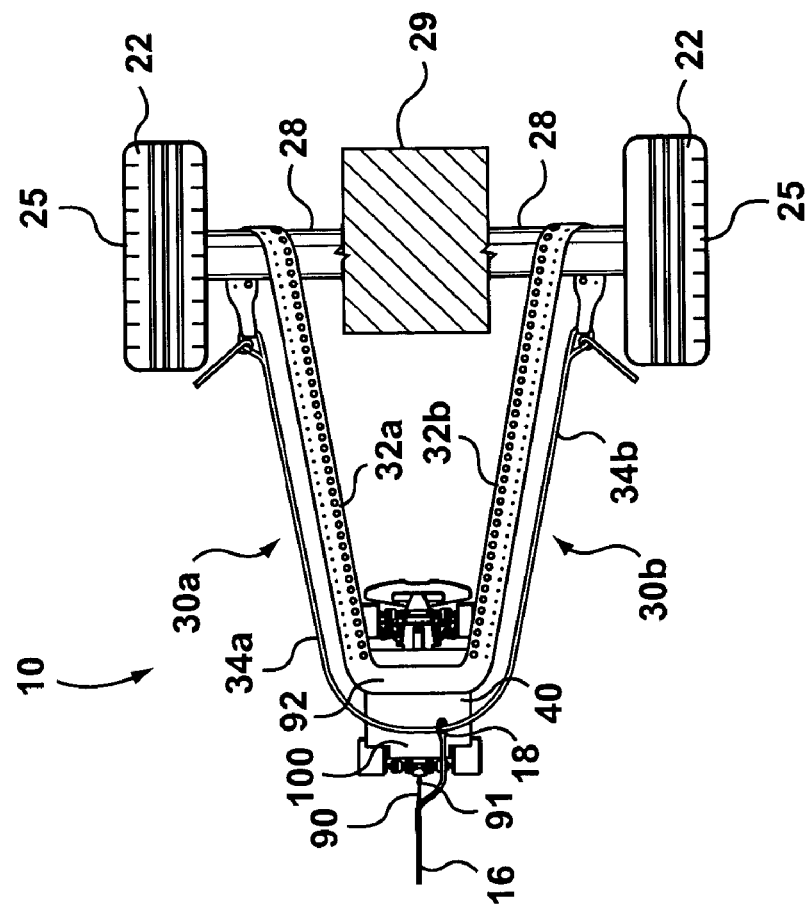

Once mobile delivery device 100 has reached its deployment position underneath target vehicle 24 (FIG. 9), capture loops 30 of tire snare 12 may be deployed. In the embodiment illustrated in FIG. 13a, tire snare 12 has two capture loops 30a and 30b for deployment on either side of mobile delivery device 100.

As described above, the capture loops 30 are deployed by actuating the ejector pin firing device 46. Once ejector pins 44 are ejected, the speed of delivery device 100 is reduced to a speed slower than that of target vehicle 24, to allow rear wheels 25 to pass over the deployed capture loops 30a and 30b. Reducing the speed of delivery device 100 may be effected by any known means such as, for example, but not limited to, brakes on wheels 104, 106 which can be activated remotely, by, for example, but not limited to, the controller 61.

Alternatively, as best seen in FIGS. 12a and 12b, reducing the speed of delivery device 100 can be accomplished by venting the forward end 114 of engine 110. In the embodiment illustrated, the body of the engine 110 has a vent cap 120 provided adjacent the forward end 114 of the engine 110. The vent cap 120 has a generally hollow cylindrical interior 122 adjacent the core 112 of the engine 110. Two transverse through-holes 124 are provided through the wall of the vent cap 120. Each hole 124 is fitted with a plug 126 having an o-ring 128 to sealingly engage the holes 124.

Each plug 126 is tethered to one of the ejection pins 44 with a suitable line 127, such as, for example, but not limited to, a length of braided wire. When ejection pins 44 are ejected, the plugs 126 are pulled from the vent holes 124, thereby enabling exhaust gasses to escape from the core 112 of the engine 110. This venting reduces the internal pressure in the engine 110 and reduces the velocity of the gas exiting the nozzle 118, thereby reducing the forward engine thrust.

Alternatively, the forward speed of the deployment vehicle may be reduced by redirecting the thrust (or exhaust gasses) exiting the nozzle 118, by, for example, providing a deflector plate immediately behind the exhaust nozzle 118 of propulsion device 103. The deflector plate may be formed to redirect the exhaust flow from propulsion device 110 toward the front of delivery device 100, thereby redirecting or reversing the thrust generated by propulsion device 110. The deflector plate may be slidably mounted on frame 102 of delivery device 100, being movable between a first position in which the deflector plate is clear of the exhaust of propulsion device 110, and a second position in which the deflector plate redirects the exhaust. The deflector plate may be moved from the first position to the second position by mechanical means engaged automatically by the firing of ejector pins 44.

Referring now to FIGS. 13a–13f, tires 22 of rear wheels 25 interact with tire snare 12 in substantially the same manner as described previously for stationary deployment applications (FIGS. 3a–3f).

Referring to FIG. 13a, immediately after deployment of tire snare 12, capture loops 30a and 30b are stretched out across the path of approaching tires 22 of rear wheels 25 of target vehicle 24. The direction of travel of tires 22 is indicated by arrow 21. As tires 22 pass over each capture loop 30, spikes 33 pierce surface 26 of tire 22, thereby attaching first portion 32 of capture loop 30 to tire 22 (FIG. 13b).

Figure 13E:
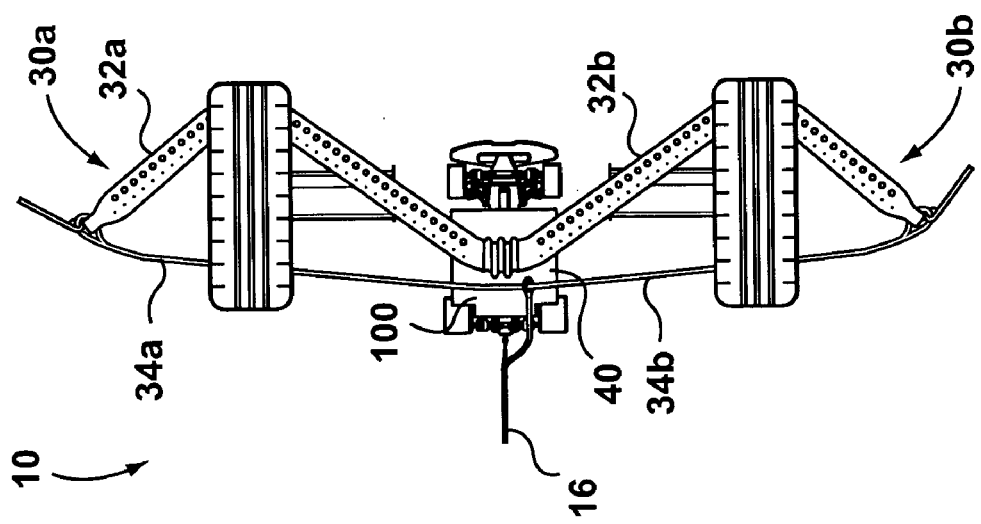

In FIG. 13c, first portion 32 of each capture loop 30 has been lifted off road surface 20 (not shown) as a result of the attachment of first portion 32 to surface 26 of tire 22. As tire 22 continues to rotate while traveling forward, second portion 32 of each capture loop 30 is carried over the top of tire 22, so that it is looped completely over tire 22 (FIG. 13d and 13e).

After capture loops 30 have looped over tires 22 at least once, the first portion 32 may be pulled taut and the spikes 33 can be ripped free from the tire 22. The capture loops 30 remain securely looped around the axle 28, and any potential un-looping is prevented by the mechanical components positioned along axle 28, such as differential gear case 29.

Referring again to FIG. 10, a tow link 90 may be provided between the mobile delivery device 100 and tether 16 to reduce or eliminate any pulling or tugging on tire snare 12 by tether 16 as mobile delivery device 100 drags tether 16 while traveling to an appropriate position underneath target vehicle 24. Tow link 90 may be in the form of, for example, but not limited to, a length of stranded steel wire, string, or rope, extending from a point near first end 18 of tether 16 to an attachment eye 91 fixed to the frame 102 of delivery device 100.

As mentioned above, the arrival of delivery device 100 at an appropriate deployment position underneath target vehicle 24 may be achieved by aiming the delivery device 100 in the required direction prior to engaging propulsion device 110. In situations where the distance between delivery device 100 and the target vehicle 24 at the time the propulsion device 110 is engaged is reasonably small, it is likely that the delivery device 100 would arrive at its deployment position without the requirement of any post-launch course adjustments.

However, it may be advantageous in some situations to provide course adjustments of the delivery device 100 as device advances towards the target vehicle 24. Directional control can be provided to facilitate the accurate arrival of delivery device 100 at its deployment position.

Such directional control may be provided, for example, but not limited to, steerability of at least one of the wheels 104, 106 of delivery device 100. In the embodiment illustrated in FIG. 14, the front wheels 104 are pivotally connected to frame 102, and are mechanically linked together by a steering linkage 130. Steering linkage 130 has a steering position control element 132 from which tie-rods 134 extend to each front wheel 104. Steering position control element 132 may be, for example but not limited to, a rack and pinion arrangement, or a pivoting eccentric device.

Furthermore, apparatus 10 may be provided with a steering control circuit 140 having a servomotor 142 operatively engaged with the steering position control element 132 of the delivery device 100. The steering control circuit 140 may be provided with automatic steering adjustment capability. For example, the steering control circuit 140 may be provided with at least one gyroscope 146. Gyroscope 146 may be a microelectronic device, fixed to frame 102 of mobile delivery device 100 and in electrical communication with the steering control circuit 140.

Figure 14:
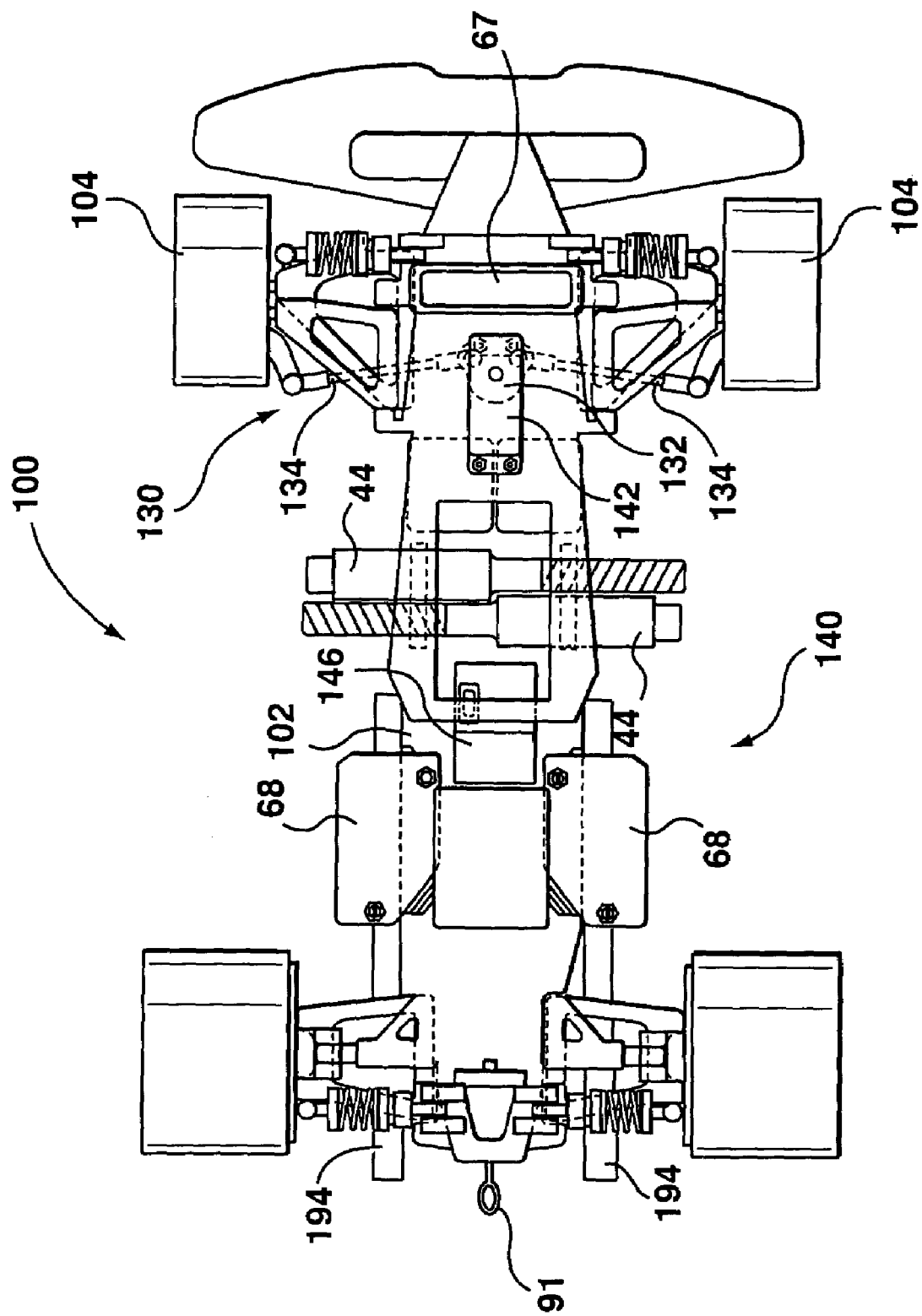
FIG. 14 is a top view of the mobile delivery device of FIG. 9 showing additional features of the delivery device.

In the embodiment illustrated in FIG. 14, the steering control circuit 140 includes one gyroscope 146 situated generally centrally in the delivery device 100. The gyroscope 146 has a generally vertical sense axis 147 (FIG. 11), about which rotation is sensed by the gyroscope 146. The gyroscope 146 feeds an adjustable pulse train signal to the servo motor 142 so that the steering of the delivery device 100 is adjusted in an effort to counteract or neutralize the sensed rotation.

Figure 15:
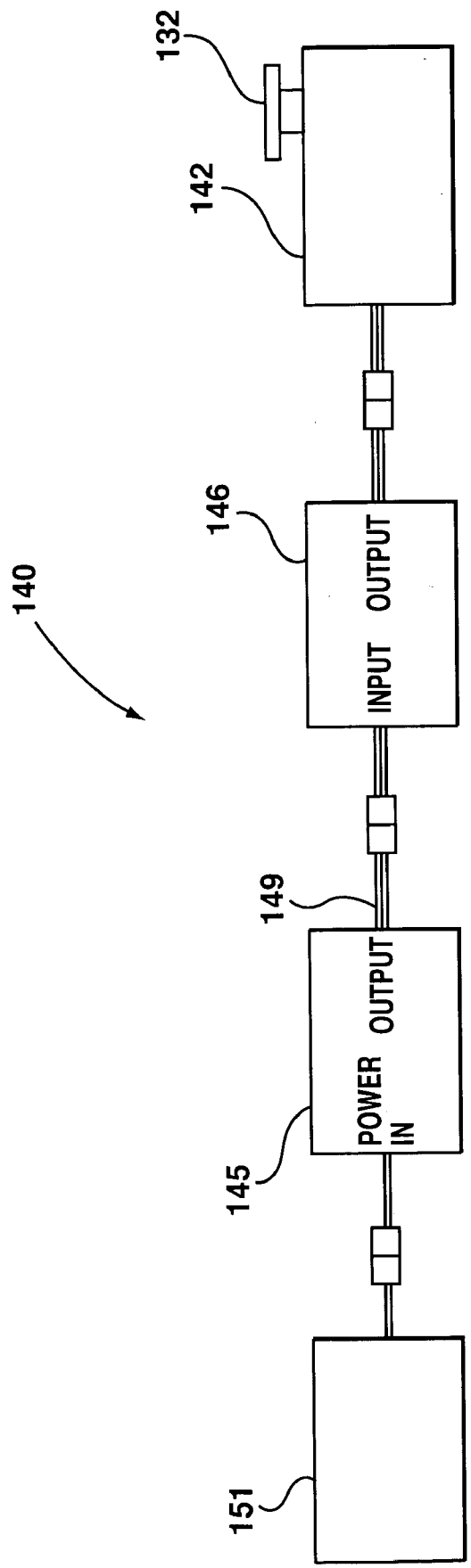
FIG. 15 is a schematic diagram of a guidance system for use with the mobile delivery device of FIG. 9.

Referring now to FIG. 15, the steering control circuit 140 can further include a reference signal generator 145 in electrical communication with the gyroscope 146. In the embodiment illustrated, the reference signal generator 145 comprises a micro-controller based pulse circuit that provides a stable signal 149 for the gyroscope 146. This stable signal 149 can direct the delivery device straight ahead. The pulse circuit has a crystal oscillator running software to generate a steady pulse train of the proper frequency and duty cycle for the gyroscope 146. A battery 151 can be provided to supply power to the reference signal generator 145.

The steering control circuit 140 may be adapted to receive signals from a guidance control system (not shown). Such a guidance control system may comprise a manually operated remote control unit (not shown) as is known in the art. Such units typically have a steering wheel which, when turned, transmit radio signals to a corresponding receiver. In the present invention, such a receiver can be mounted on-board the delivery device 100, in communication with the steering control circuit 140.

Referring again to FIG. 9, the mobile delivery device 100 may be dispatched from a moving vehicle, such as a dispatching vehicle 99 traveling proximate the target vehicle 24. In such an embodiment, second end 19 of tether 16 may be fixed to the dispatching vehicle 99, so that the dispatching vehicle 99 can brake and thereby bring the target vehicle 24 to a stop.

To carry delivery device 100 and to dispatch delivery device 100 from dispatching vehicle 99, a mobile launch platform 170 may be provided. Launch platform 170 may be fixed to the front of dispatching vehicle 99.

Figure 16B:
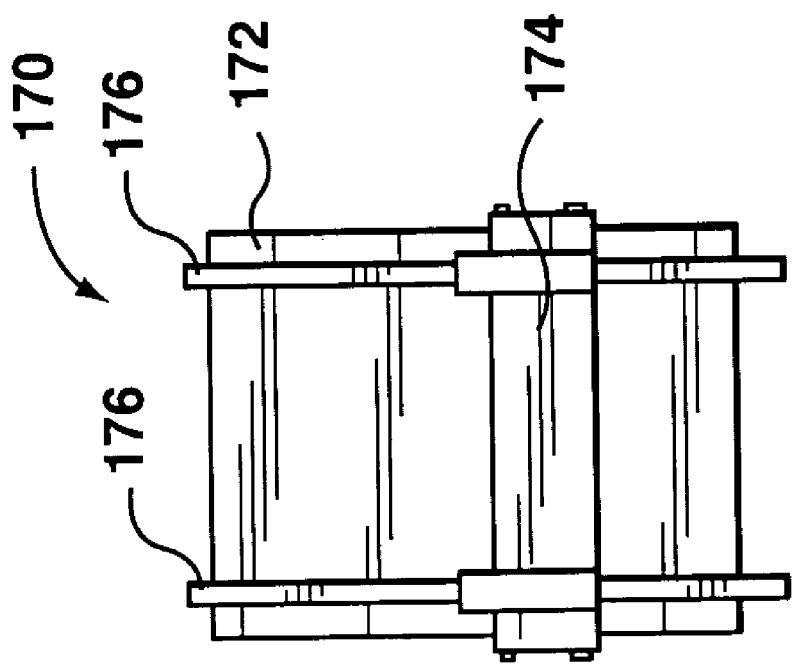
FIGS. 16a and 16b are side and rear elevations, respectively, of a mobile launch platform for use with the delivery device of FIG. 9.
Figure 16A:
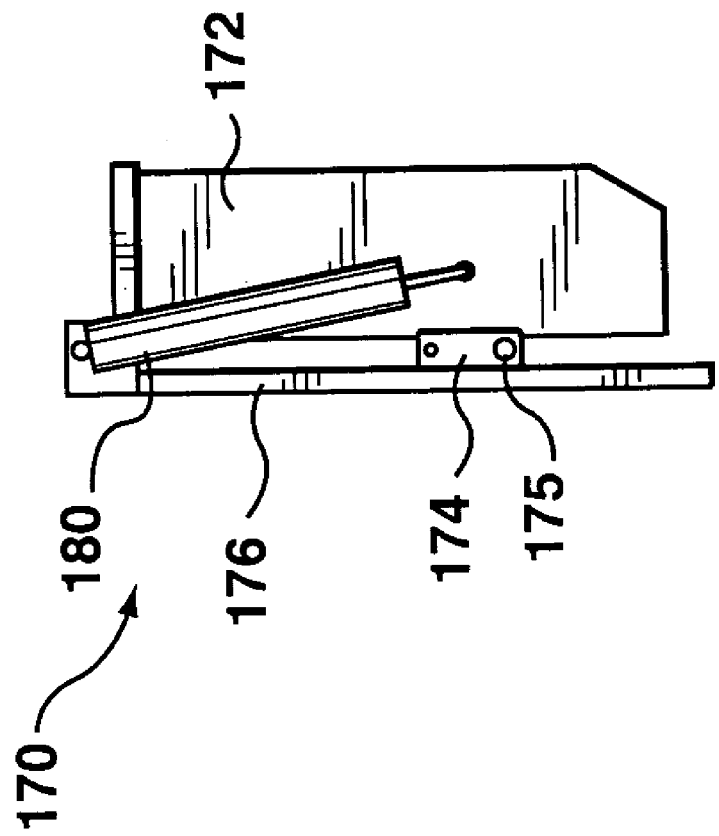

Referring now to FIGS. 16a and 16b, in one embodiment the launch platform 170 has an enclosure 172 which is pivotally mounted to a carriage 174 at pivot point 175. Carriage 174 is slidably mounted to a pair of vertical rails 176. Enclosure 172 is shaped to receive delivery device 100, and has one open side 178. Enclosure 172 has an upright position in which opening 178 faces vertically upwards, and a horizontal position in which opening 178 faces forwards, toward target vehicle 24.

Referring now to FIGS. 17a–17d, an actuator 180 can be provided for raising and lowering the enclosure 172 along the rails 176, and for pivoting the enclosure 172 from the vertical to the horizontal position. The actuator 180 can be in the form of, for example, but not limited to, a hydraulic cylinder or an electric linear actuator.

In the embodiment illustrated, the actuator 180 is attached to enclosure 172 at pin 182. When the actuator 180 is in its retracted position, enclosure 172 is in its raised vertical position (FIG. 17a). As the actuator 180 extends, enclosure 172 descends towards its lowered position (FIG. 17b). As pin 182 descends below pivot point 175, enclosure 172 begins to pivot about pivot point 175 towards its horizontal position (FIG. 17c). This action may be facilitated by provision of tension spring 184, positioned to urge a rearward portion of the enclosure 172 upwards as a forward portion of the enclosure 172 is forced downwards. When actuator 180 is fully extended, enclosure 172 containing delivery device 100 is in its horizontal position, with the opening 178 facing a target vehicle 24 (FIG. 17d).

To return enclosure 172 to its raised vertical position, actuator 180 is retracted, thereby pulling enclosure 172 forward and upward as enclosure 172 pivots about pivot point 175. A cover plate 179, extending in a horizontal plane adjacent an upper end of rails 176, may be provided as a stop against which the open side 178 of the enclosure 172 is drawn when moving to its raised, vertical position. Cover plate 179 serves to protect the interior of enclosure 172 from exposure to the elements.

Figure 18:
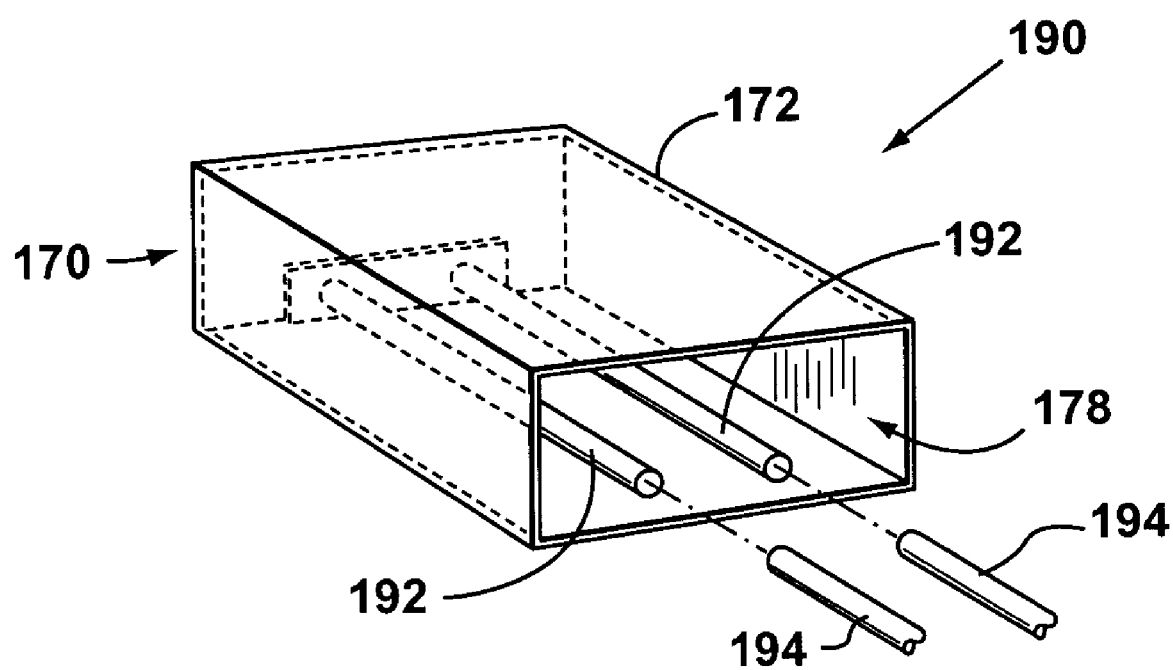
FIG. 18 is a perspective view of elements of a launch aiming system for use with the launch platform of FIGS. 16a and 16b.

Referring now to FIG. 18, the launch platform 170 may further be provided with a launch aiming system 190 to facilitate directional control of the mobile delivery device 100 during launch from the platform 170. In the embodiment illustrated, the launch aiming system 190 comprises a pair of spaced apart launch rods 192 fixed within the enclosure 172, and a pair of launch tubes 194 fixed to the mobile delivery device 100 (see also FIG. 14). The rods 192 are secured to the rear of the enclosure 172 and extend in parallel towards the opening 178. The tubes 194 are secured to the underside of the frame 102 of the delivery device 100, inboard the track of the rear wheels 106, and at a height that keeps the tubes 194 clear of the ground. The tubes 194 are sized to provide a sliding fit along the rods 192. To use the aiming system 190, the tubes 194 are slid over the rods 192 when loading the delivery device 100 into the enclosure 172. During launch of the delivery device 100 from the platform 170, the delivery device is constrained to move forward along the length of the rods 192, as long as at least a portion of the tubes 194 engages a portion of the rods 192. In this way, the launch aiming system 190 aids in directing the device 100, particularly prior to the time that the wheels 104,106 of the device 100 engage the ground.

Figure 19:
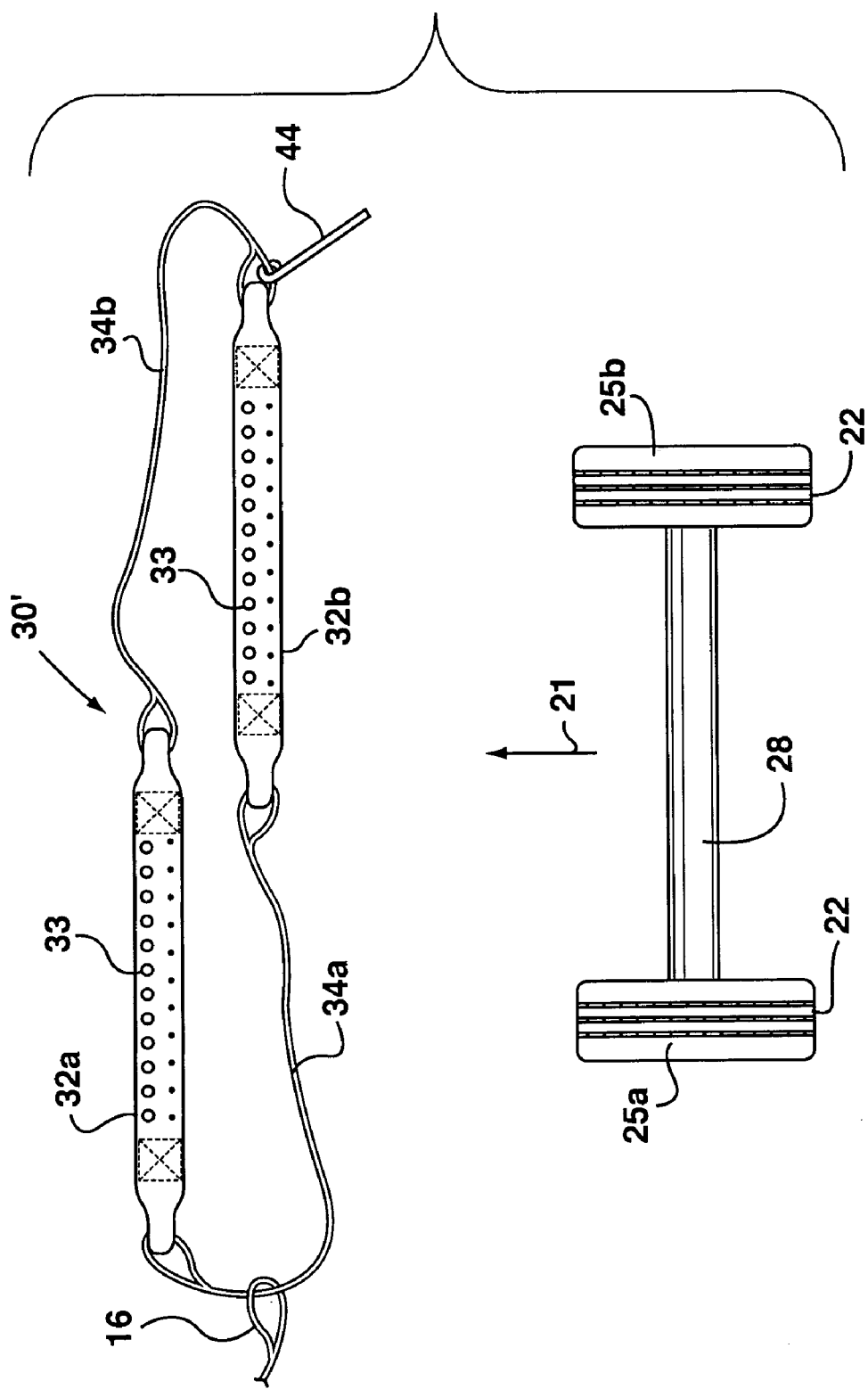
FIG. 19 is a top view of an alternate embodiment of a vehicle stopping apparatus according to the present invention, having a capture loop deployed on a road surface across the path of an oncoming target vehicle.

Other embodiments of various elements of the present invention are also contemplated herein. For example, an alternative embodiment of a capture loop 30' can be seen in FIG. 19. The capture loop 30' has two "active" or first portions 32 and two "inert" or second portions 34. For ease of reference, the two first portions 32 of the capture loop 30' are identified as 32a and 32b. The two second portions 34 are identified as 34a and 34b.

In the embodiment illustrated, each of the portions 32a, 32b, 34a, and 34b have a linear extent equal to about one-quarter of the total perimeter (i.e. circumferential length) of the capture loop 30'. Furthermore, in the embodiment illustrated, the two first portions 32a and 32b are alternately interspersed with the two second portions 34a and 34b. In other words, the first portions 32 and second portions 34 are provided alternately along the perimeter (or circumferential length) of the capture loop 30'. In the illustrated embodiment, the first portion 32a extends between the second portion 34a and the second portion 34b. A tether 16 is attached to the capture loop 30', the joint connecting the first portion 32a to the second portion 34a. An ejector rod 44 is attached to the capture loop 30' generally opposite the tether 16, near the joint where the first portion 32b is attached to the second portion 34b.

When deployed for use, the capture loop 30' can extend in a flattened loop configuration across the path of the wheels 25 of an oncoming vehicle. In the flattened loop configuration, the first portion 32a and the second portion 34b can be generally co-linear. The second portion 34a and the first portion 32b can also be generally co-linear, with the second portion 34a aligned adjacent to and parallel with the second portion 34b. The capture loop 30' can be sized so that lengths of the first portion 32a and second portion 34a span the path of a left wheel 25a of an approaching vehicle, and the first portion 32b and second portion 34b span the path of a right wheel 25b of an approaching vehicle.

Upon driving over the capture loop 30', the spikes 33 provided in the active portions 32a and 32b can become embedded in the respective tires 25a and 25b. The vehicle can then be ensnared as described previously. Providing the dual segments 32a and 32b of the active portion 32 in the capture loop 30' can increase the probability of capturing at least one tire in a side-deployment application (such as, for example, a stationary deployment as described with respect to FIG. 7a–7c). Furthermore, if both tires 25a and 25b were to become ensnared by the capture loop 30', the slack in the inert portions 34a and 34b can facilitate desired looping of the capture loop 30' around the axle 28. The inert portions 34a, 34b can avoid potential problems that could be experienced if a single active portion 32 of sufficient length to span both tires 25a and 25b were to be used. For example, a single active portion spanning both tires 25a and 25b may not work satisfactorily in cases where both tires become attached to the capture loop 30', since each tire would exert a force tending to pull the capture loop 30' free from the opposite tire, as the web were to be lifted up and over each tire.

While preferred embodiments of the invention have been described herein in detail, it is to be understood that this description is by way of example only, and is not intended to be limiting. The full scope of the invention is to be determined from reference to the appended claims.

The invention claimed is:

1. A vehicle stopping apparatus for stopping a target vehicle, the apparatus comprising:
   a. a capture loop, said capture loop being large enough to loop over a vehicle tire for coupling said capture loop to said target vehicle;
   b. attachment means provided over a first portion of the capture loop to attach said first portion of the capture loop to said vehicle tire; at least while looping said capture loop over said vehicle tire; and
   c. a tether having a first end coupled to the capture loop and a second end spaced horizontally away from said target vehicle when said capture loop is coupled thereto, the tether being adapted to be gripped at its second end for transmitting a resistive force on the the capture loop, when coupled to said target vehicle.

2. The apparatus of claim 1 wherein the capture loop is constructed of material comprising para-aramid fibers.

3. The apparatus of claim 1, wherein the capture loop comprises a continuous perimeter.

4. The apparatus of claim 3, wherein the capture loop comprises a second portion having a non-adhering surface.

5. The apparatus of claim 4, wherein the first portion and the second portion are on diametrically opposing sides of the capture loop.

6. The apparatus of claim 5, wherein the first portion and second portion each extend about one-half the perimeter of the capture loop.

7. The apparatus of claim 1 wherein the attachment means comprises at least one protrusion adapted to penetrate the outer surface of a vehicle tire.

8. The apparatus of claim 7 wherein the at least one protrusion comprises spikes.

9. The apparatus of claim 8 wherein the spikes are provided with barbs.

10. The apparatus of claim 1 wherein the tether has a shock cord portion, the shock cord portion comprising a resilient material.

11. The apparatus of claim 1 further comprising an anchoring device coupled to the tether, the anchoring device adapted to apply said resistive force on the capture loop through the tether.

12. The apparatus of claim 1 further comprising a deployment mechanism adapted to transfer the at least one capture loop from a set position wherein said capture loop is folded in a bundle, to a deployed position wherein said capture loop is extended across the path of said vehicle tire.

13. The apparatus of claim 12 wherein the deployment mechanism comprises:
   a) at least one bay adapted to support the capture loop in the set position;
   b) an ejector pin firing device mounted proximate the bay; and
   c) an ejector pin, the ejector pin positioned in ejectable engagement with the ejector pin firing device, and the ejector pin having an attachment to a point along said capture loop.

14. The apparatus of claim 10 further comprising at least one sensor adapted to detect the presence and absence of the vehicle tire, and a controller operatively linked to the sensor and the ejector pin firing device.

15. The apparatus of claim 12 wherein the deployment mechanism is secured in a stationary position adjacent the path of said vehicle tire.

16. The apparatus of claim 12 further comprising a mobile delivery device wherein said deployment mechanism is mounted to said mobile delivery device.

17. The apparatus of claim 14 wherein the mobile delivery device comprises a frame supported by wheels, and wherein the mobile delivery device is of a sufficiently small size to pass between the rear wheels of a target vehicle.

18. The apparatus of claim 17 wherein the mobile delivery device comprises a propulsion device mounted on-board the mobile delivery device.

19. The apparatus of claim 16 wherein the propulsion device comprises a solid fuel rocket engine.

20. The apparatus of claim 17 wherein at least one of the wheels of the mobile delivery device is pivotally mounted to the frame the mobile delivery device, the at least one wheel pivotable about a generally vertical axis for steering said mobile delivery device.

21. The apparatus of claim 19 wherein the mobile delivery device further comprises two pivotally mounted front wheels each connected to a steering linkage.

22. The apparatus of claim 21 further comprising a guidance system, the guidance system comprising a servo motor operatively connected to the steering linkage of the mobile delivery device and a steering control circuit operatively connected to the servo motor.

23. The apparatus of claim 22 wherein the guidance system further comprises at least one electronic gyroscope mounted on the mobile delivery device, wherein the gyroscope is in electrical communication with the steering control circuit.

24. The apparatus of claim 16 further comprising a launch platform for dispatching the mobile delivery device, wherein the launch platform is adapted to be fixed to a dispatching vehicle traveling proximate the target vehicle, and wherein the tether is secured to said dispatching vehicle.

25. The apparatus of claim 24 wherein the launch platform comprises an enclosure which houses mobile delivery device, the enclosure having an opening through which the delivery device exits the enclosure.

26. The apparatus of claim 23 wherein the launch platform further comprises a launch aiming system for directing the mobile delivery device during launch from the platform.

27. The apparatus of claim 26 wherein the launch aiming system comprises at least one rod fixed within the enclosure and directed towards the opening of the enclosure.

28. The apparatus of claim 27 wherein the launch aiming system further comprises at least one tube fixed to delivery device and sized to provide a sliding fit along the at least one rod.

29. A method of stopping a targeted vehicle, the method comprising:
   a) providing a tire snare, the tire snare having at least one capture loop wherein the capture loop is large enough to loop over a vehicle tire and wherein the capture loop has attachment means provided over a portion of the capture loop to attach said portion of the capture loop to said vehicle tire, and the tire snare having a tether coupled to the capture loop;
   b) deploying the capture loop in front of the path of the tire of the targeted vehicle; and
   c) after the tire of the targeted vehicle has engaged the capture loop, applying a resistive force on the tether to resist further travel of the targeted vehicle.

30. The method of claim 29 wherein step (a) further comprises the step of providing a deployment mechanism, the deployment mechanism having at least one bay adapted to support the capture loop in the set position, an ejector pin firing device mounted proximate the bay, and an ejector pin, the ejector pin positioned in ejectable engagement with the ejector pin firing device, and the ejector pin having an attachment to a point along said capture loop; and wherein step (b) further comprises the step of actuating the ejector pin firing device.

31. The method of claim 30 wherein step (a) further comprises providing a mobile delivery device, wherein said mobile delivery device has an on-board propulsion device and said deployment mechanism is mounted to said mobile delivery device; and step (b) further comprises, prior to actuating the ejector pin firing device, aiming the mobile delivery device towards the targeted vehicle and then actuating the on-board propulsion device.

32. The method of claim 31 wherein step (a) further comprises providing at least one sensor to detect a tire of the targeted vehicle, and a controller operatively connected to the sensor and the ejector pin firing device; and step (b) further comprises, after actuating the on-board propulsion device and prior to actuating the ejector pin firing device, reading the sensor to confirm arrival of the delivery device at an appropriate deployment position relative to the targeted vehicle.

33. The method of claim 32 wherein step (a) further comprises providing a guidance system for guiding the mobile delivery device to said deployment position.

34. The apparatus of claim 8 wherein the spikes are provided in distinct first and second rows of spikes, wherein the first and second rows extend in parallel along said first portion of the length of the capture loop, and wherein the spikes in the first row are directed in one direction away from the surface of the capture loop, and the spikes in the second row are directed in substantially the opposite direction.

35. A vehicle stopping apparatus for stopping a target vehicle, the apparatus comprising:
   a capture loop, said capture loop being large enough to loop over a vehicle tire for coupling said capture loop to said target vehicle;
   attachment means provided over a first portion of the capture loop to attach said first portion of the capture loop to said vehicle tire at least while looping said capture loop over said vehicle tire; and
   a tether having a first end coupled to the capture loop and a second end spaced away from the first end, the tether constructed of high-strength material for transmitting a resistive force on the capture loop when coupled to said target vehicle; and
   an anchoring device coupled to the second end of the tether, the anchoring device adapted to arrest further travel of said target vehicle by applying said resistive force on said capture loop through the tether.

* * * * *